US011477279B1

(12) United States Patent
Avrilionis et al.

(10) Patent No.: US 11,477,279 B1
(45) Date of Patent: Oct. 18, 2022

(54) DIGITAL ASSETS EXCHANGE COORDINATION

(71) Applicant: Compellio S.A., Luxembourg (LU)

(72) Inventors: Denis Avrilionis, Hesperange (LU); Thomas P. Hardjono, Winchester, MA (US)

(73) Assignee: COMPELLIO S.A., Luxembourg (LU)

(*) Notice: Subject to any disclaimer, the term of this patent is extended or adjusted under 35 U.S.C. 154(b) by 0 days.

(21) Appl. No.: 17/477,230

(22) Filed: Sep. 16, 2021

Related U.S. Application Data

(60) Provisional application No. 63/212,147, filed on Jun. 18, 2021.

(51) Int. Cl.
| H04L 67/1095 | (2022.01) |
| H04L 9/32 | (2006.01) |
| H04L 67/1097 | (2022.01) |
| H04L 61/4511 | (2022.01) |
| H04L 9/00 | (2022.01) |

(52) U.S. Cl.
CPC ........ *H04L 67/1095* (2013.01); *H04L 9/3236* (2013.01); *H04L 9/3297* (2013.01); *H04L 61/4511* (2022.05); *H04L 67/1097* (2013.01); *H04L 9/50* (2022.05)

(58) Field of Classification Search
CPC ............... H04L 9/3247; H04L 9/3236; H04L 9/3297; H04L 9/30; H04L 63/123; H04L 63/12; H04L 2209/38; H04L 67/1097; H04L 67/10; G06Q 20/02; G06Q 20/3827; G06Q 20/389; G06Q 20/3825; G06Q 20/4014
See application file for complete search history.

(56) References Cited

U.S. PATENT DOCUMENTS

| 10,102,526 | B1* | 10/2018 | Madisetti | ......... G06Q 20/38215 |
| 10,924,548 | B1* | 2/2021 | Karumbunathan | ........................... H04L 61/4552 |
| 11,036,677 | B1* | 6/2021 | Grunwald | ............... G06F 3/067 |
| 2017/0012943 | A1* | 1/2017 | Kaliski, Jr. | ......... H04L 63/0823 |
| 2018/0322491 | A1* | 11/2018 | Madisetti | .................. H04L 9/30 |
| 2019/0005469 | A1* | 1/2019 | Dhupkar | ............... H04L 9/0637 |
| 2019/0012249 | A1* | 1/2019 | Mercuri | .................. G06F 9/542 |
| 2019/0279172 | A1* | 9/2019 | Duffield | ............... H04L 9/3247 |
| 2019/0354708 | A1* | 11/2019 | Fisher | .................. G06F 16/221 |

(Continued)

*Primary Examiner* — Tae K Kim
(74) *Attorney, Agent, or Firm* — Nicholson De Vos Webster & Elliott LLP

(57) ABSTRACT

Techniques are described for decentralized transaction processing involving digital asset transfer among heterogeneous systems including blockchains and traditional digital asset-providing services. When an application program seeks to modify the state of an asset, it typically strives to ensure that the off-chain real world asset and the digital asset on the blockchain are synchronized. This continuous synchronization is performed to prevent changes in the asset ownership on the blockchain from being conducted without a corresponding state change in the off-chain real world asset. To ensure a correct and consistent state in both the real and digital worlds, the notion of a digital twin is used where a mediating set of computers sit between the two worlds. Furthermore, since transactions in the real world may consist of multiple sub-transactions that occur across various other computers, the notion of a logical unit of work is used to unify the notion of asset-based transactions.

20 Claims, 25 Drawing Sheets

(56) References Cited

U.S. PATENT DOCUMENTS

| | | | | |
|---|---|---|---|---|
| 2020/0005912 A1* | 1/2020 | Saliman | ................ | G16H 10/60 |
| 2020/0267163 A1* | 8/2020 | Wilson | ................. | G06F 16/907 |
| 2020/0322413 A1* | 10/2020 | Saraf | .................... | H04L 67/289 |
| 2020/0344042 A1* | 10/2020 | Hwang | ............... | G06F 16/2246 |
| 2020/0344061 A1* | 10/2020 | Hwang | ................ | H04L 9/3239 |
| 2021/0073212 A1* | 3/2021 | Conley | ............. | G06Q 20/4014 |
| 2021/0176038 A1* | 6/2021 | Bortnikov | ............. | H04L 9/0643 |
| 2021/0226774 A1* | 7/2021 | Padmanabhan | ....... | H04L 9/3239 |

* cited by examiner

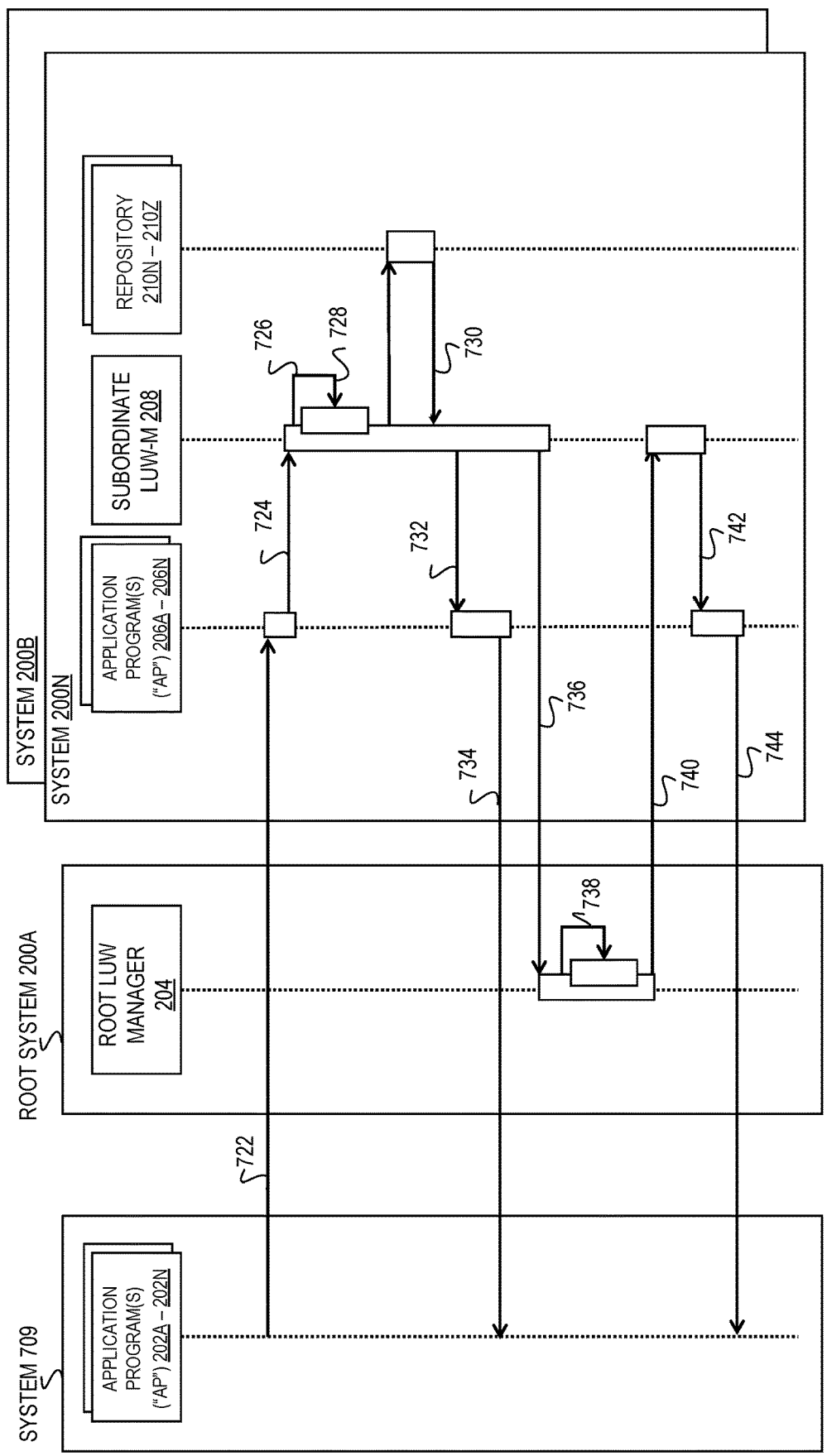

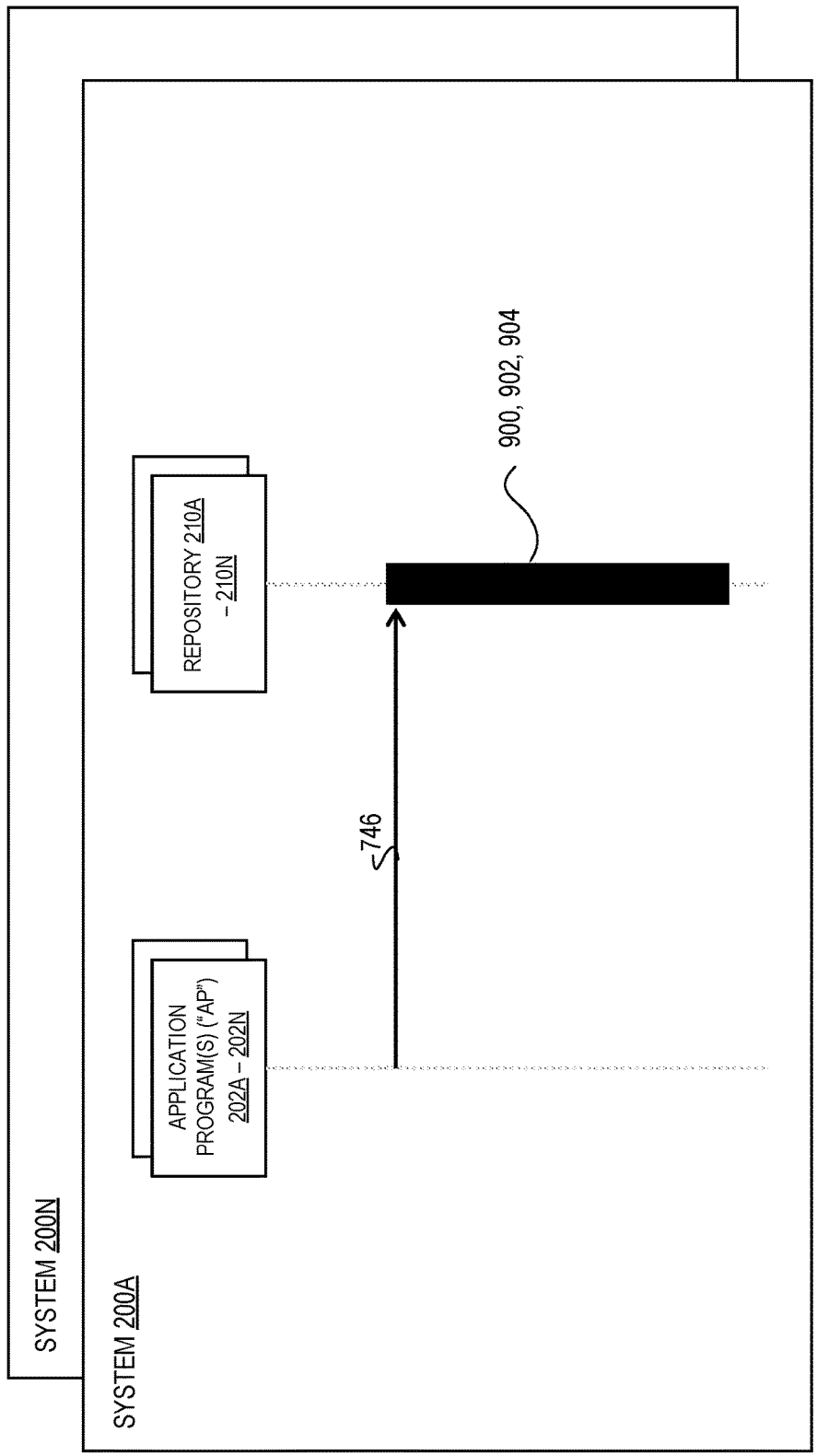

LOGICAL UNIT OF WORK TRANSACTIONAL PROCESSING SEQUENCE: PREPARE 700D

LOGICAL UNIT OF WORK TRANSACTIONAL PROCESSING SEQUENCE: COMMIT 700E

LOGICAL UNIT OF WORK ROLLBACK 700F

DESIGN BY CONTRACT VERIFICATION OF STATE TRANSITIONS 920

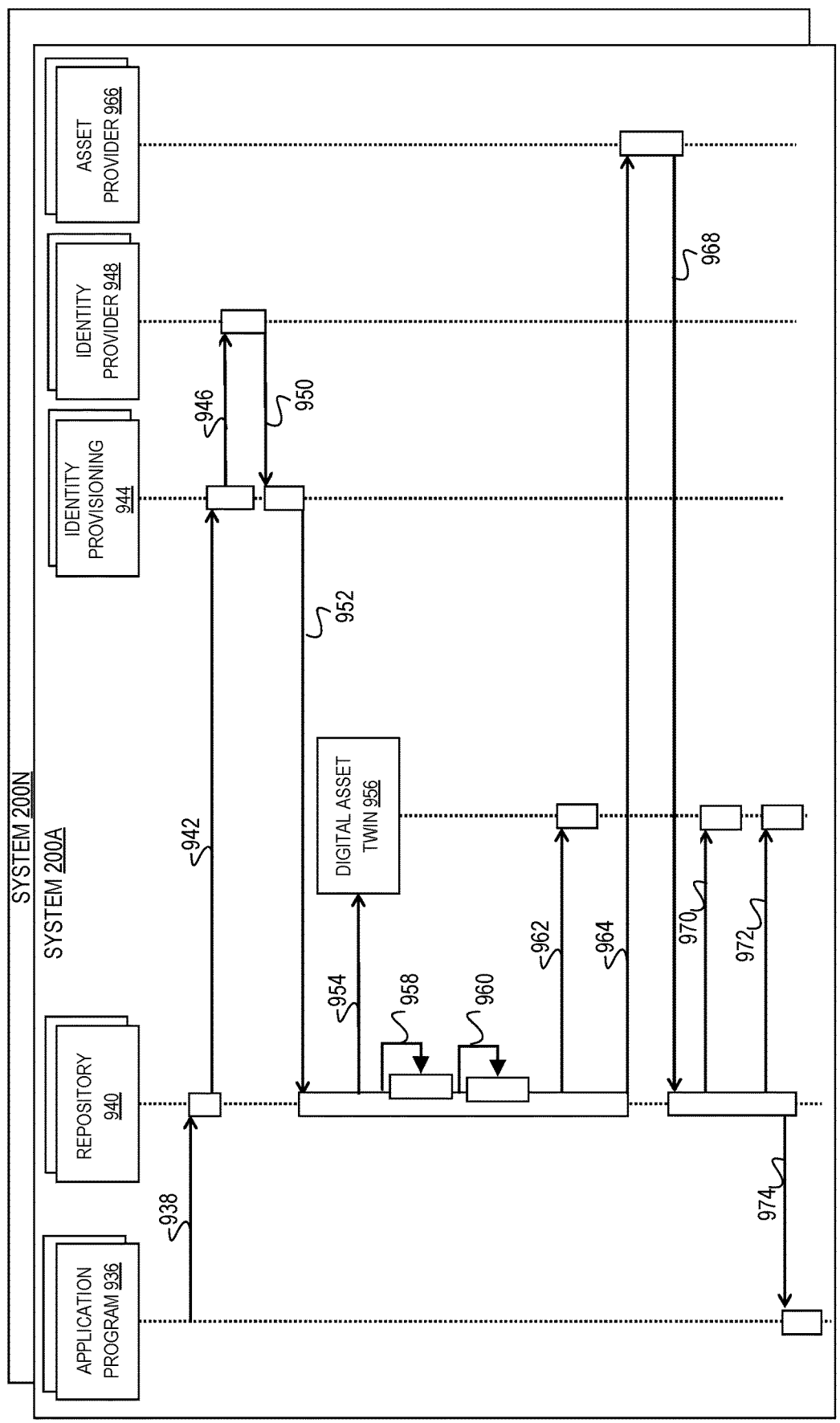

DIGITAL ASSET TWIN LIFECYCLE: MODIFICATION 911

DIGITAL ASSET TWIN LIFECYCLE: DESTRUCTION 913

US 11,477,279 B1

DIGITAL ASSETS EXCHANGE COORDINATION

TECHNICAL FIELD

The present disclosure relates to distributed computing, where mediating computers are used to interface with and coordinate disparate blockchain networks and transactional systems. The mediating computer systems use the notions of a decentralized logical unit of work with digital twin asset repositories to ensure that transactions that execute across systems (including blockchain networks) are completed in a secure and atomic fashion.

BACKGROUND

Distributed ledger technology is increasingly being used across a wide variety of use cases to record transactions and other information using decentralized storage and associated protocols. Among other benefits, this technology provides for the highly secure recordation of transactions on digital ledgers due in part to their inherently decentralized and transparent nature. While the use of such distributed ledger technology continues to increase, a vast amount of data remains stored in more traditional types of data stores such as relational databases, cloud-based storage services, and the like.

BRIEF DESCRIPTION OF THE DRAWINGS

FIG. 7B shows a sequence flow of an exemplary method for communicating among application programs in the context of a logical unit of work according to some embodiments.

FIG. 7C shows a sequence flow of an exemplary method for constructing, updating, or destructing transactional digital asset twins participating in a logical unit of work according to some embodiments.

FIG. 9C shows a sequence flow of an exemplary method for constructing a digital asset twin according to some embodiments.

DETAILED DESCRIPTION

The following description of embodiments define non-limiting representative examples that describe features of different aspects of the invention. The embodiments described should be recognized as capable of implementation separately or when relevant, in combination with other embodiments of the invention.

The present disclosure relates to methods, apparatus, systems, and non-transitory computer-readable storage media for decentralized transaction processing involving digital asset transfer among heterogeneous systems including blockchains as well as traditional digital asset providing services. When an application program (e.g., an asset trading or management application) seeks to modify the state of an asset, it typically strives to ensure that the off-chain real world asset (e.g., real estate, item from an art collection, etc.) and the digital asset on the blockchain (e.g., tokens) are synchronized. This continuous synchronization is performed to prevent changes in the asset ownership on the blockchain from being conducted without a corresponding state change in the off-chain real world asset. To ensure a correct and consistent state in both the real and digital worlds, the notion of a digital twin is used where a mediating set of computers sit in between the two worlds (on-chain and off-chain). Furthermore, since transactions in the real world may consist of multiple sub-transactions that occur across various other computers, the notion of a logical unit of work (or "LUW") is used to unify the notion of asset-based transactions.

In the case where a transaction is composed of multiple sub-transactions, each of the sub-transactions atomically commits in order for the entirety of the transaction to be considered committed. This relationship among sub-transactions is represented as a hierarchy or tree of logical units of work, which are uniquely identified across the twin worlds of on-chain and off-chain asset representations. The mediating computer systems may implement the notion of a "digital asset bridge" that interconnects various asset state management systems (e.g., smart contracts, traditional databases, etc.).

Figure 1:
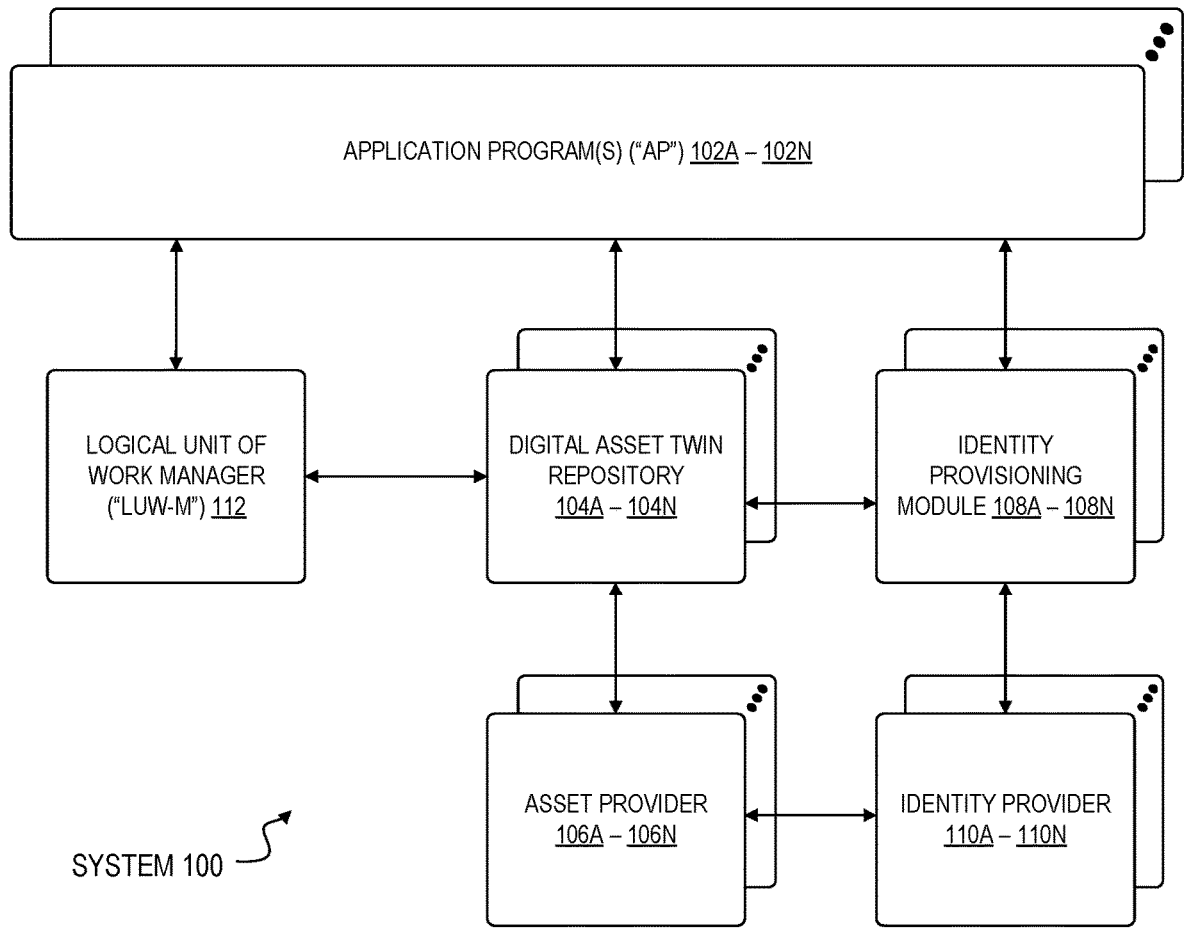
FIG. 1 shows an illustration of a functional diagram of control flows of an instance of a decentralized processing system according to some embodiments.

FIG. 1 is a diagram illustrating example control flows of an instance of an example decentralized processing system 100 according to an embodiment. According to some embodiments, the components of the system represent instances of executable services that can range from single processes to larger computerized sub-systems composed of sub-components. The arrows represent flow of control among components of the system 100. Components may perform computational tasks including, but not limited to, interactions with users via interfaces, resource retrieval, or communications with other components. Components can be deployed in any form including as cloud-based services, applications deployed in on-premises environments, as blockchain executables (e.g., smart contracts), as well as applications running on devices like smart phones or other specialized hardware, or otherwise. Components communicate over computer networks including but not limited to the internet or virtual private networks, or otherwise. In some examples, interactions among components are based on application programming interfaces (APIs) implemented with technologies such as but not limited to Representational State Transfer (REST) or other form of Web Services, proprietary Remote Procedure Call (RPC)-based protocols, or otherwise.

According to some embodiments, a computerized application program (or "AP") (e.g., one of APs 102A, . . . , 102N) manipulates resources in the form of digital asset twins (or "DATs") created and managed by digital asset twin repositories (e.g., one or more of digital asset twin repositories 104A, . . . , 104N). In some embodiments, digital asset twins are data object instances that follow a state transition life cycle (illustrated also in FIGS. 8A-8E). A digital asset twin repository managing a digital asset twin generally is responsible for instantiating the digital asset twin and managing consistency in the transition of states for that digital asset twin. Digital asset twins are object-oriented digital representations that correspond to digital or physical assets in the real world. In some examples, digital asset twins maintain an explicit reference to the assets that they represent. It is the responsibility of each repository managing a specific digital asset twin to interact with a corresponding digital asset provider (e.g., one of digital asset providers 106A, . . . , 106N) of the correlated asset to maintain consistency of processing. Examples of assets represented by digital asset twins include but are not limited to cryptotokens, pieces of music, digital art works, administrative documents, physical products, or any other digital or physical embodiment of fungible or non-fungible entities that convey monetary value, legal value, ownership of underlying entities or any other characteristic that can be assigned to them, making these assets meaningful for exchange with other assets.

In some embodiments, access to digital asset twins by an application program is subject to authorization based on identity verification via an identity provisioning module (e.g., one of identity provisional modules 108A, . . . , 108N). Identity provisioning modules handle aspects related to the links of digital asset twins with the owners of the correlated assets. In some examples, the identity provisioning modules delegate some aspects of identity credential verification to specialized identity providers (e.g., one or more of identity providers 110A, . . . , 110N).

Figure 2:
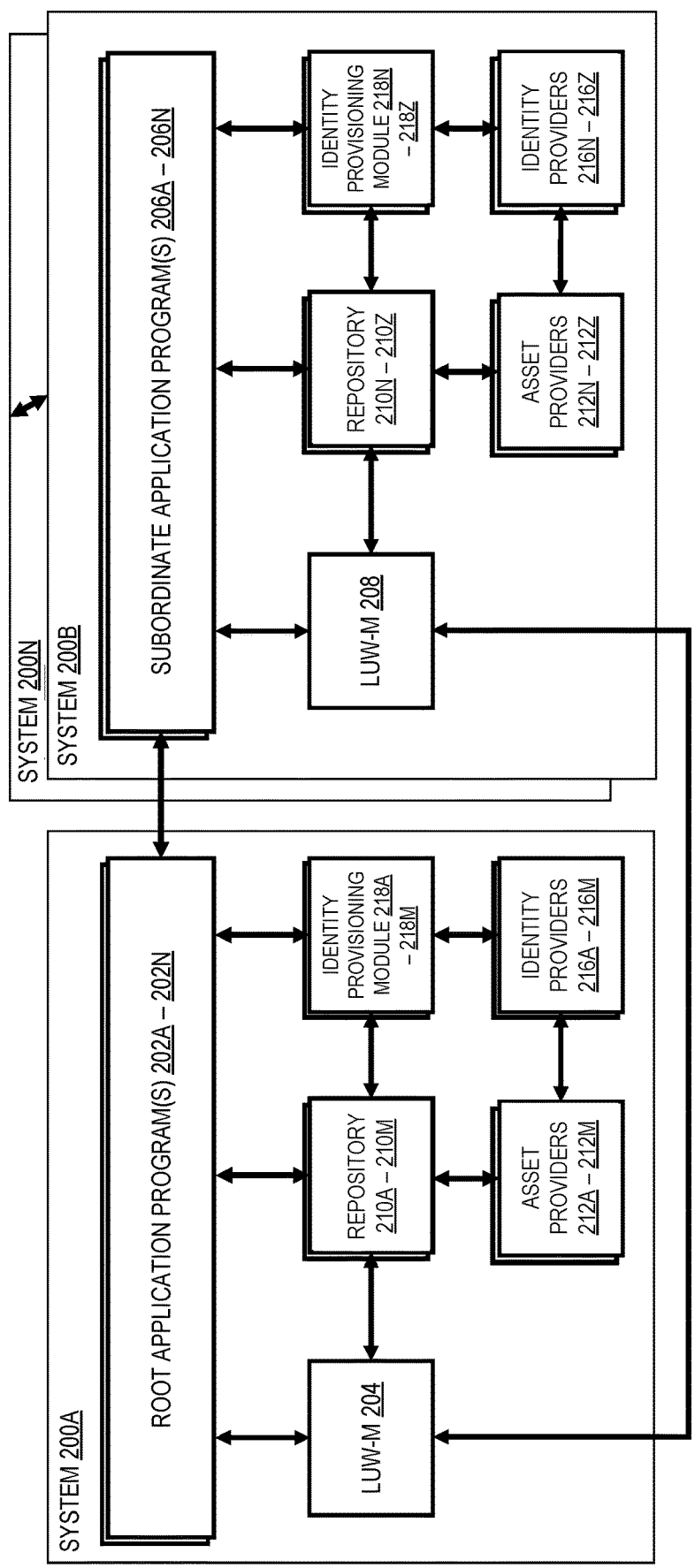
FIG. 2 shows an illustration of a plurality of decentralized processing systems coordinating to perform a logical unit of work according to some embodiments.
Figure 4:
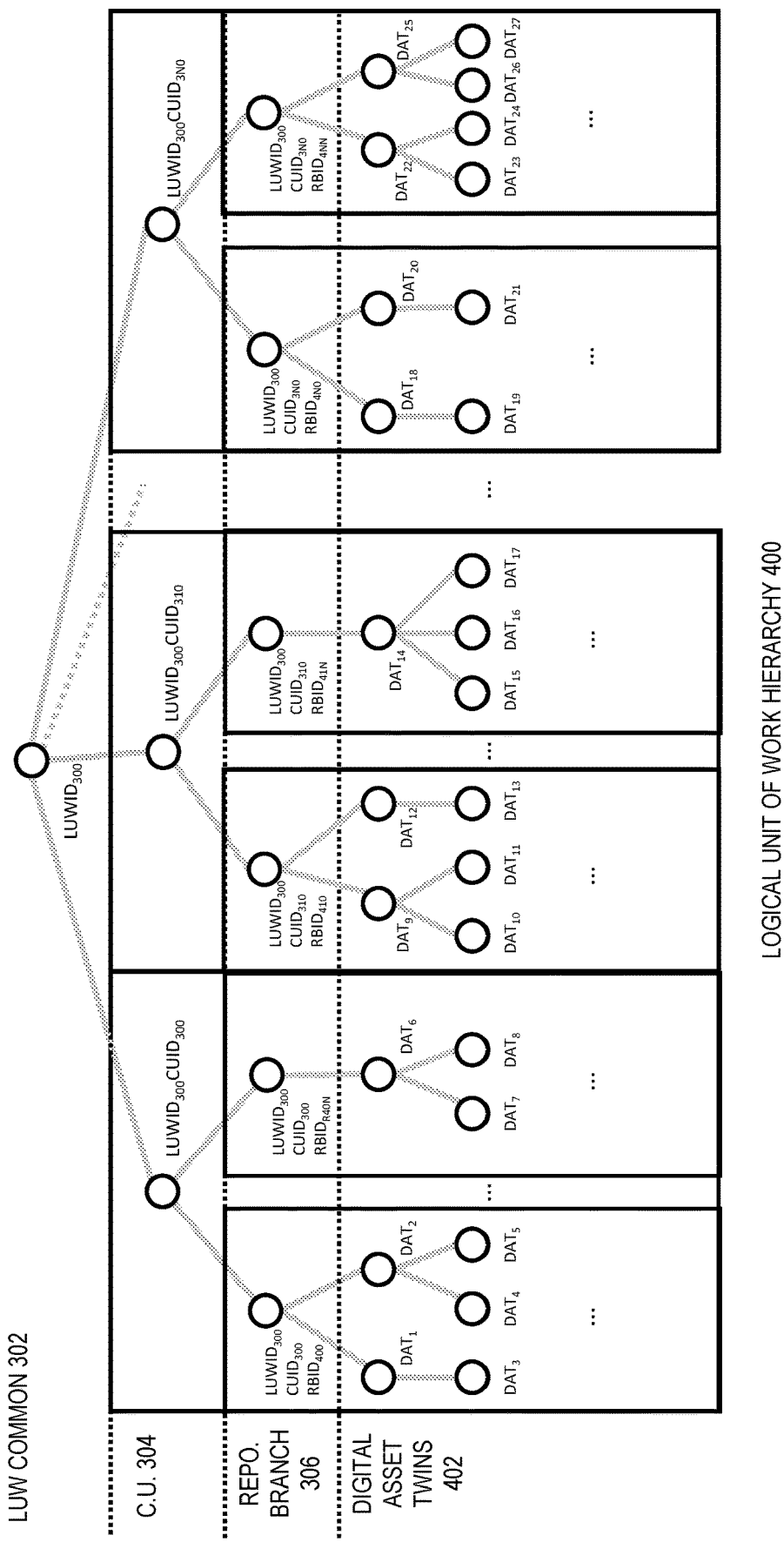
FIG. 4 shows an illustration of a logical unit of work as a hierarchy of control according to some embodiments.

One aspect of the described embodiments is to coordinate state updates of digital asset twins via a transactional logical unit of work. As illustrated in FIGS. 4 and 7, a logical unit of work is represented by a data structure defining boundaries that encompass a set of state modifications of digital asset twins participating in the logical unit of work. A logical unit of work, for example, enables the components of the system 100 as well as the components of any other remote systems participating in the logical unit of work (e.g., as shown in FIG. 2) to atomically perform modifications on all digital asset twins in a single decentralized transaction or to discard modifications all together. Upon completion of a logical unit of work (e.g., a commit or a rollback), digital asset twin repositories interact with the relevant digital asset providers to align the state of digital asset twins with the correlated assets. For this to happen, in some embodiments, digital asset twin repositories can rollback (or revert) modifications to all digital asset twins that were subject to modification during that logical unit of work to the state before the beginning of the logical unit of work. Moreover, it is assumed that asset providers can synchronize the state of assets with the state of their correlated digital asset twins. In some examples, this implies that digital asset providers can manage assets in a way to guarantee atomicity, consistency, isolation, and durability (ACID) properties. In some examples, this further implies that the digital asset providers reserve the asset at the beginning of the logical unit of work to be able to perform any kind of synchronization with the correlated digital asset twin at the end of the logical unit of work, e.g., from modification to consumption or destruction of the asset.

In some examples, a logical unit of work manager (or "transaction manager") coordinates the completion of a logical unit of work. To do so, the logical unit of work manager 112 interacts with one or more digital asset twin repositories 104A, . . . , 104N of the system 100 as well as with logical unit of work managers from remote systems. For every system, in some examples, there is only one logical unit of work manager 112 responsible for completing the part of the logical unit of work running on the specific system. Logical unit of work managers communicate among one another to complete (e.g., to commit or rollback) a logical unit of work in an atomic way. In some examples, logical unit of work managers are computerized sub-systems that are globally discoverable via global registries such as the Domain Name System (DNS) or otherwise.

An application program 102 initiates a logical unit of work by requesting creation of the logical unit of work from the local logical unit of work manager 112. The logical unit of work manager 112 enables communication between the application program 102 and a digital asset twin repository (e.g., one of repositories 104A, . . . , 104N) such that the application program 102 can access digital asset twins managed by the digital asset twin repository during the logical unit of work. Different application programs 102A, . . . , 102N can communicate with the same logical unit of work manager 112 to retrieve different sets of digital asset twins from different digital asset twin repositories 104A, . . . , 104N. An application program 102 can at any moment elect to abandon a logical unit of work, for example, because of a user decision, due to a computing verification error, because of a system failure that prevents the application program from retrieving or storing a digital asset twin, or due to communication errors. In such cases, if there are modifications to the state of digital asset twins as modified by that application program, the entire logical unit of work is rolled back. Rollback is a possible completion of a logical unit of work and is not considered as an error or an exception.

FIG. 2 illustrates an exemplary embodiment where a root application program (e.g., one or more of root application programs 202A, . . . , 202N) initiates a logical unit of work via its logical unit of work manager 204 (or "transaction manager"). In this example, the logical unit of work manager 204 is the "root" logical unit of work manager controlling the completion of the request logical unit of work. The root application programs 202A, . . . , 202N interact among one another, with subordinate application programs 206A, . . . , 206N, and/or with their respective logical unit of work managers and related digital asset twin repositories during a logical unit of work. The root logical unit of work manager 204 interacts with subordinate logical unit of work managers (e.g., logical unit of work manager 208) to complete the logical unit of work. Digital asset twin repositories 210A, . . . , 210Z interact with their respective logical unit of work manager to persist state changes of digital asset twins during the logical unit of work. In some examples, digital asset twin repositories are responsible for maintaining modifications of digital asset twin states occurred during a logical unit of work, while digital asset providers 212A, . . . , 212Z guarantee consistent modifications of assets based on the state of their correlated digital asset twins upon completion of the logical unit of work.

Figure 3:
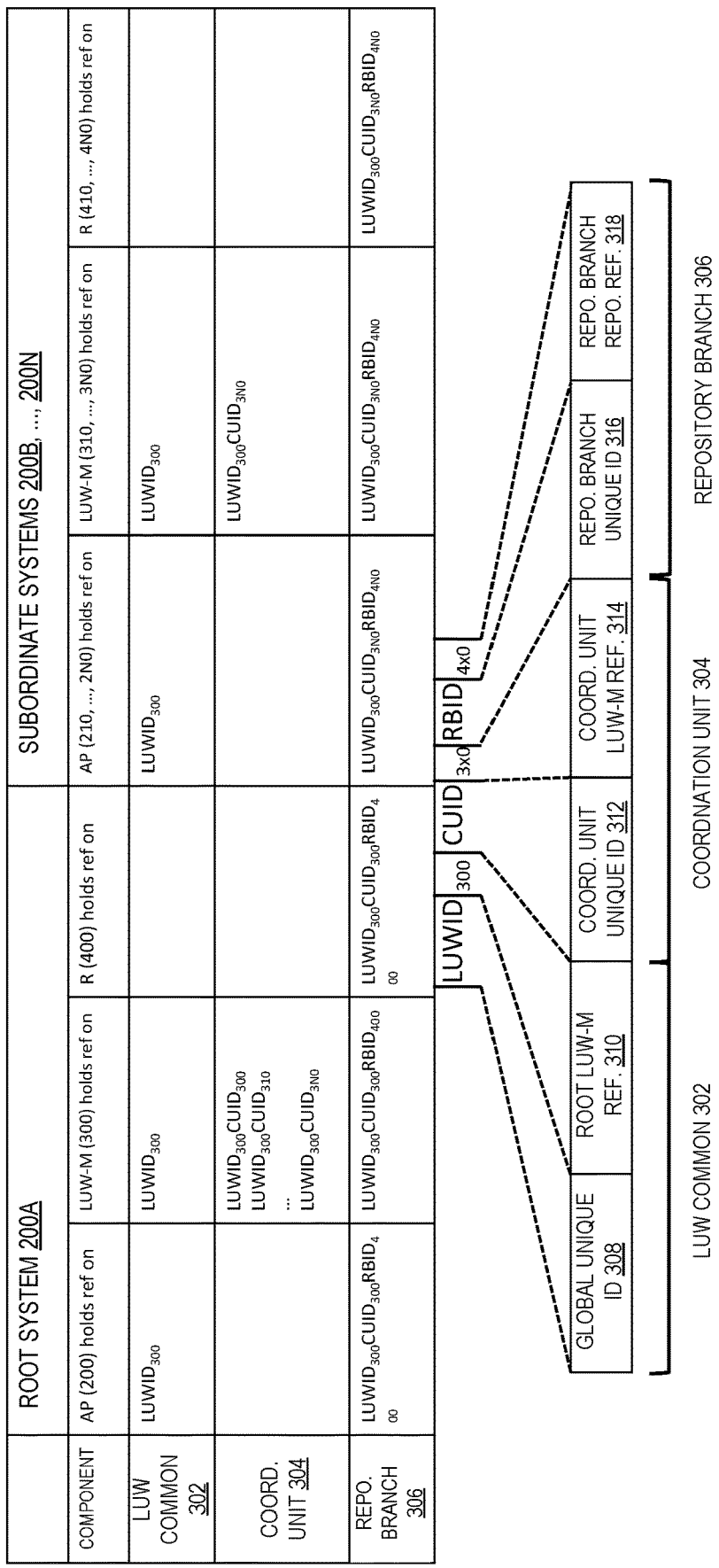
FIG. 3 shows an illustration of a logical unit of work as an example data entity according to some embodiments.

FIG. 3 illustrates an exemplary embodiment regarding one possible representation of a logical unit of work entity structure 300 (or "transaction context data structure"). A logical unit of work entity structure 300 is representing context shared among application programs (e.g., application programs 202A, . . . , 202N and application programs 206A, . . . , 206N) logical unit of work manager 204, 208 and digital asset twin repositories 210A, . . . , 210Z participating in the same logical unit of work. Such context allows consistent completion of a logical unit of work despite occasional failure of the components of the systems participating in the logical unit of work. In its full extent, a logical unit of work entity structure 300 is composed of at least three parts: 1) the logical unit of work common part 302 composed of at least a global unique identifier of the logical unit of work 308 as well as a reference 310 to the root logical unit of work manager (e.g., logical unit of work manager 204) that initiated the logical unit of work; 2) the coordination unit (or "CU") part 304 composed of a coordination unit identifier 312 (which is unique within the scope of the logical unit of work), as well as a reference 314 to the logical unit of work manager that controls the coordination unit (e.g., where the logical unit of work manager that controls the coordination unit can be a root logical unit of work manager or any subordinate logical unit of work manager); 3) a repository branch part 306 composed of a repository branch identifier 316 (unique within the scope of a logical unit of work), as well as a reference 318 to the digital asset twin repository that controls the repository branch. As illustrated in FIG. 4, the root logical unit of work manager 204 maintains the list of all coordination units 304 of the logical unit of work.

FIG. 4 illustrates an exemplary embodiment regarding one possible representation of a logical unit of work hierarchy 400 of control. A logical unit of work is created by the root logical unit of work manager, which is the first logical unit of work manager (e.g., LUW-M 112) called by an application program (e.g., one of application program(s) 102A, . . . , 102N) to initiate a new logical unit of work. The logical unit of work is created with the intention of the application program to access some digital asset twins on a local digital asset twin repository. The root logical unit of work manager creates a global identifier which is common to the whole logical unit of work 400, then creates a coordination unit 304 unique for the system 100. Furthermore, the logical unit of work manager contacts a repository (e.g., one of repositories 104A, . . . , 104N) to create a repository branch 306. The repository branch 306 is then associated to the coordination unit of the system 100. The application program can access digital asset twins for that logical unit of work by contacting the repository and passing as a context the repository branch of the logical unit of work. The application program can pass the logical unit of work identifier to other collaborating application programs in the context of that logical unit of work. When an application program 206A, . . . , 206N receives that logical unit of work identifier and wants to participate to that logical unit of work, it communicates that logical unit of work identifier to its local logical unit of work manager 208. The local logical unit of work manager then creates a coordination unit (or "CU") 304 and related repository branch 306 in the local system and contacts the root logical unit of work manager to bind the coordination units with that logical unit of work. This process creates a hierarchy structure as depicted in FIG. 3 where each participating system is represented by a coordination unit and all related repositories are under the control of that coordination unit. Digital asset twins accessed by application programs in the context of that logical unit of work are further associated with the repository branch of their repository. When application programs are accessing digital asset twins on a given repository, in some embodiments, all application programs adopt a common sequence for accessing the digital asset twins 402. This creates further hierarchical dependencies among digital asset twins of a repository. In some embodiments, digital asset twins are created, modified, or destructed according to that hierarchy in each repository. In case of rollback of a given repository branch, the rollback is propagated to the corresponding coordination unit and then to the whole logical unit of work. The root logical unit of work manager is responsible for consistently rolling back all coordination units and repository branches of the logical unit of work in collaboration with all other logical unit of work managers that participate to the logical unit of work.

Figure 5:
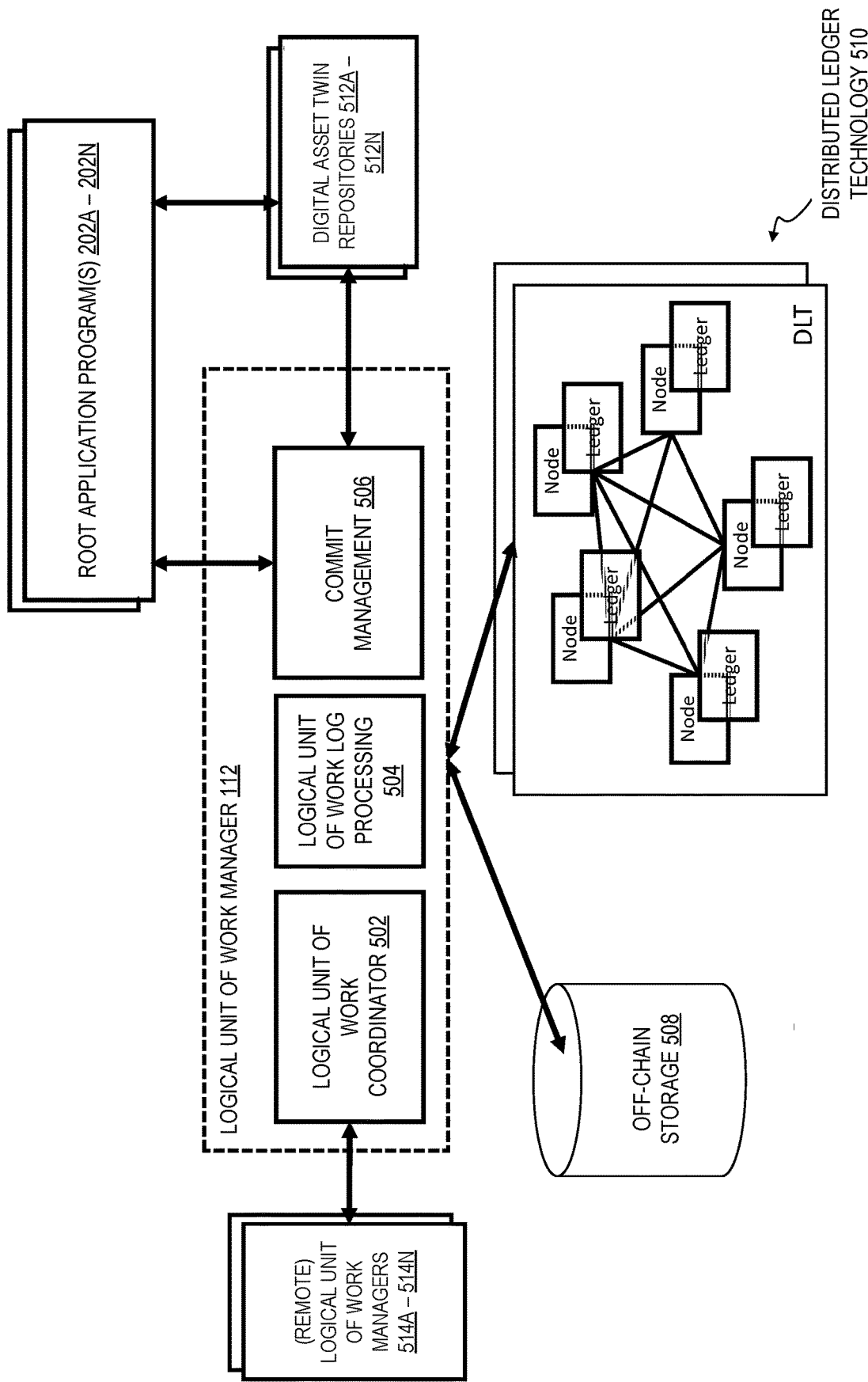
FIG. 5 shows an illustration of example components of a logical unit of work manager (or "transaction manager") according to some embodiments.

FIG. 5 illustrates an exemplary embodiment where a logical unit of work manager is composed of three components (collectively referred to as logical unit of work manager components 500). The logical unit of work coordinator 502 handles interaction with other logical unit of work managers from remote systems to consistently manage the transactional completion of logical units of work that spawn across multiple systems. Commit management 506 is responsible for organizing completion of the logical unit of work upon request by the application program in the local system. Digital asset twins that participate to the logical unit of work and managed by the repository of that system are collectively committed to their final state or rolled back to their initial state (by initial state, we refer to the state of a digital asset twin during the initialize stage of the logical unit of work), depending on the decision taken by the root logical unit of work manager after examining the result obtained by all subordinate logical unit of work managers of all participating systems. In some embodiments, a logical unit of work commits only if all digital asset twins' modifications of all repositories on all participating systems are possible; otherwise, the logical unit of work rolls back, and all digital asset twins are reverted to their initial state. Logical unit of work log processing 504 maintains information about the logical unit of work state, allowing operations to resume after failure of the logical unit of work without affecting the completion of the logical unit of work. Typically, information about the logical unit of work entity is maintained by the logical unit of work manager and saved on an off-blockchain storage space 508 capable of executing transactions in an Atomic, Consistent, Isolated and Durable (ACID) manner. Logical unit of work managers may store cryptographic hashes of the serialized form of logical unit of work state information using distributed ledger technology (DLT) 510 in combination with off-chain storage. This is similar to the way digital asset twins are managed by repositories, as illustrated in FIGS. 8B and 8C. In that sense, logical unit of work state information managed by a logical unit of work manager is also represented by digital asset twins.

Figure 6:
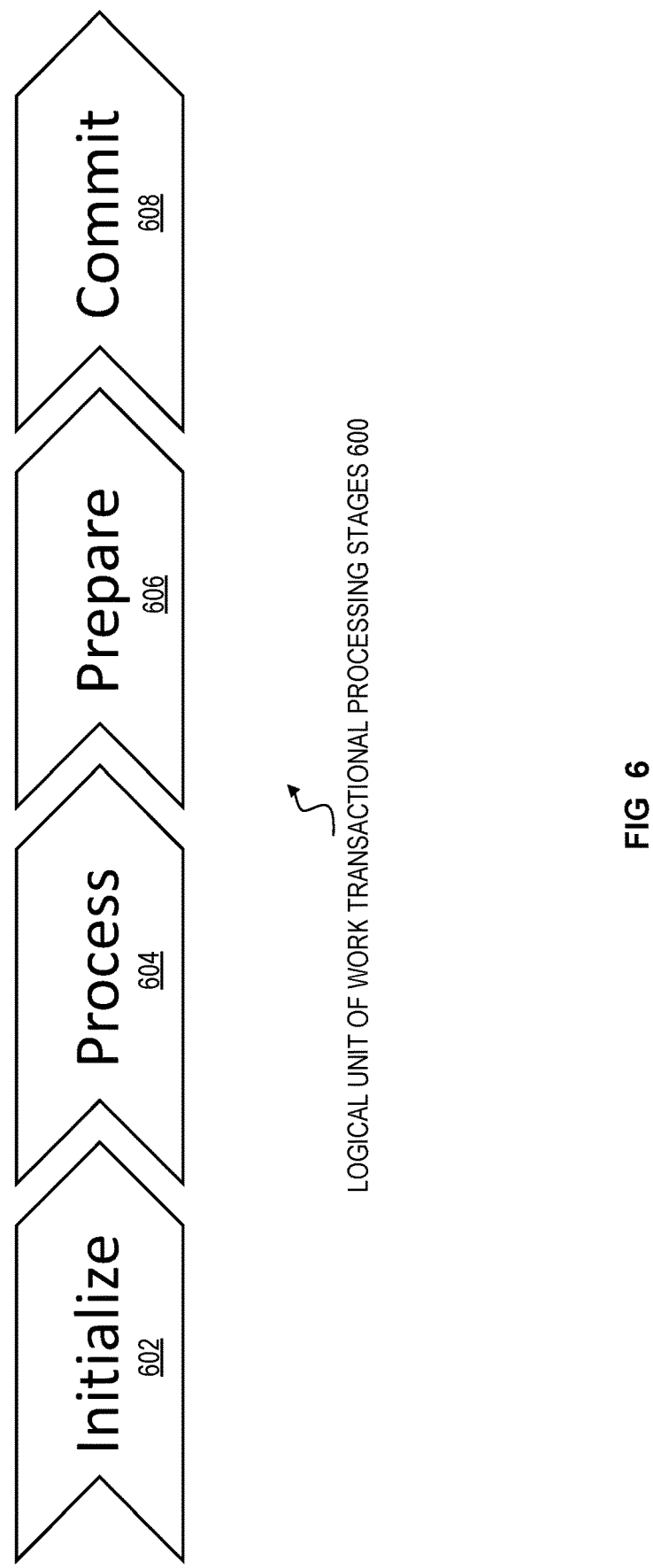
FIG. 6 shows an illustration of the transactional processing stages of a logical unit of work according to some embodiments.

FIG. 6 illustrates an exemplary embodiment of a high-level representation of the process 600 for the transactional completion of a logical unit of work following stages. During the initialize stage 602, a root application program (e.g., one of root application programs 202A-202N) initiates the logical unit of work by contacting the logical unit of work manager that is connected to the relevant repositories. During the process stage 604, application programs are accessing digital asset twins via their repositories to modify digital asset twins' state. Upon completion of the work, the root application program can instruct the root logical unit of work manager to commit the logical unit of work and thus enter in the prepare stage 606. During the prepare stage 606, the root logical unit of work manager contacts all subordinate logical unit of work managers, which in turn call all related repositories, to perform all required steps to complete the logical unit of work. When the system determines that a logical unit of work can complete without failure of any kind, it commits the logical unit of work during the commit stage 608. During commit, the final state of digital asset twins during that logical unit of work is synchronized with their correlated assets. The assets are modified in unison and their modification take permanent effect. In some embodiments, either commitment or rollback always results to a consistent state for all assets that were part of the logical unit of work via their digital asset twins. In this context, "completion" refers either to commitment or rollback of the states of digital asset twins that participated in a logical unit of work.

Figure 7A:
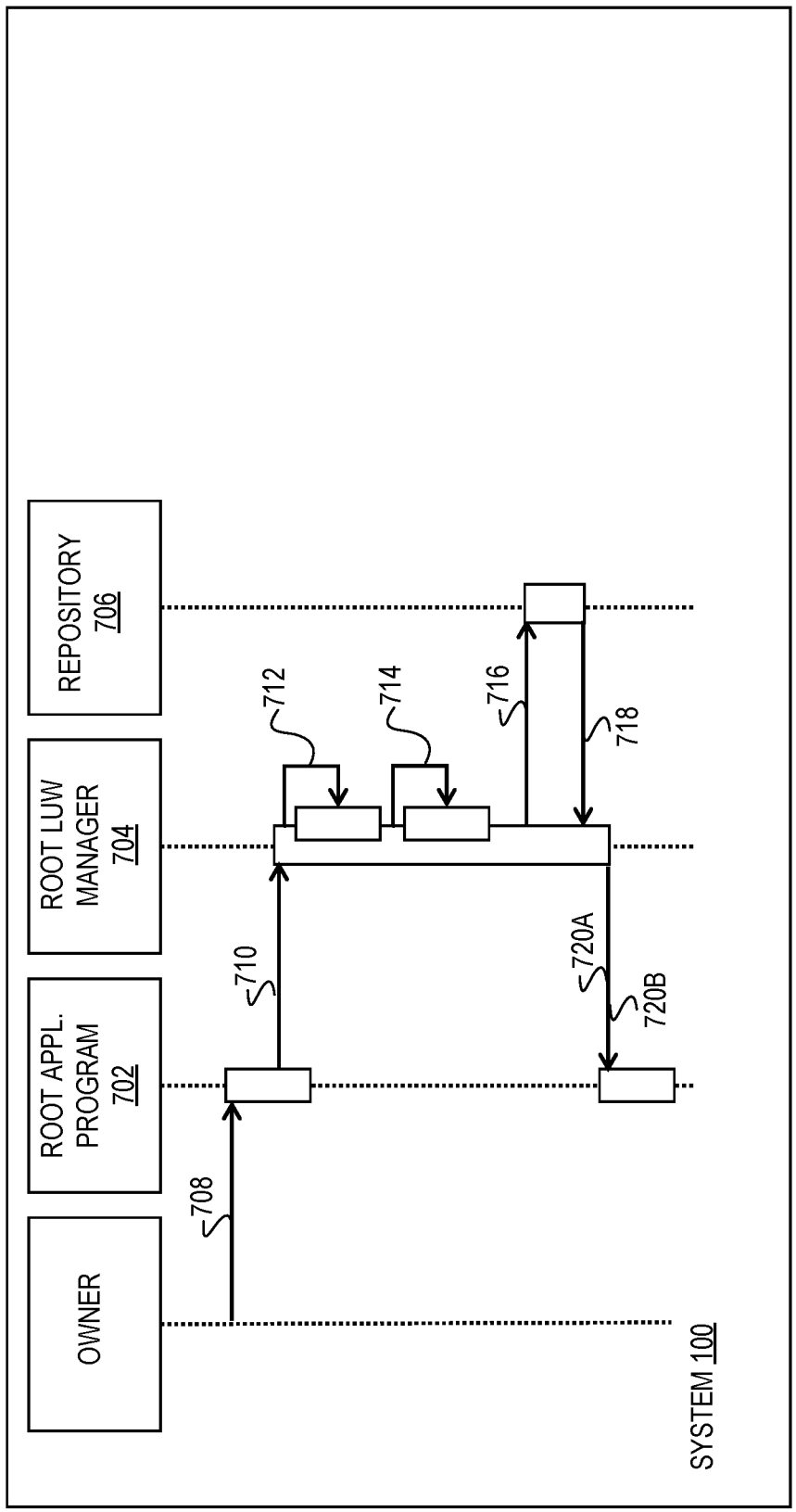
FIG. 7A shows a sequence flow of an exemplary method for initiating a logical unit of work according to some embodiments.

FIG. 7A illustrates an exemplary embodiment related to one possible sequence of interactions during the initialize stage 602 of the logical unit of work transactional processing by a root system 100. A request 708 from an owner of some digital assets to a root application program 702 results in a subsequent request 710 from an application program 702 to its local root logical unit of work manager 704 to start a new logical unit of work. In some examples, the root logical unit of work manager 704 creates 712 the common part of the logical unit of work context (e.g., logical unit of work common 302) and then creates 714 the coordination unit (e.g., a coordination unit 304) related to the root system for that logical unit of work. Moreover, the logical unit of work manager 704 calls 716 the local digital asset twins repository to create a repository branch 706. Upon successful completion of the repository branch, at 718 the full logical unit of work entity is returned to the application program 720A. Any failure at the stage of processing causes termination of processing for that logical unit of work 720B. From that point of processing onwards, in some embodiments, any subsequent call from an application program to the local logical unit of work manager or repository refers to the respective coordination unit and repository branch. In some embodiments, any attempt to access digital asset twins outside the specific coordination unit and repository branch either returns an error or can lead to the creation of a new logical unit of work.

FIG. 7B illustrates an exemplary embodiment related to one possible further sequence of interactions during the initialize stage 602 of the logical unit of work transactional processing 600. The exemplary embodiment involves interactions among application programs 202A, . . . , 202N willing to participate in the same logical unit of work. More specifically, in the case of one of application programs 202A, . . . , 202N of a system 709 is willing to interact with one or more of application programs 206A, . . . , 206N accessing digital asset twins available via another repository (e.g., one of repositories 210N, . . . , 210Z) of a remote system 200N, the application program initiates a call 722 to the other application program by sharing the logical unit of work entity (e.g., initialize LUW(LUWID$_{300}$)). The application program (e.g., one of application program(s) 206A, . . . , 206N) calls 724 the local logical unit of work manager 208 to join the logical unit of work (e.g., join (LUWID$_{300}$)), causing creation 726 of a subordinate CU (e.g., LUWID$_{300}$CUID$_{320}$) for system 200N as well as creation 728 of a repository branch on the subordinate repository (e.g., one of repositories 210N, . . . , 210Z) (e.g., LUWID$_{300}$CUID$_{320}$RBID$_{420}$). The result of creating the repository branch is returned 730 to the subordinate logical unit of work manager 208. In case 730 is successful, the newly created coordination unit and repository branch of system 200N are added to the logical unit of work entity and the logical unit of work entity is returned 732 to the subordinate application program (e.g., one of application program(s) 206A, . . . , 206N). In case of failure, the application program notifies 734 application program 202A, . . . , 202N. Application program 202A, . . . , 202N can further decide whether to pursue the logical unit of work or not. If the operation is successful, the logical unit of work manager 208 of the subordinate system requests 736 binding of system's 200N coordination unit to the root logical unit of work manager 704. The root logical unit of work manager 704 binds 738 that coordination unit to the logical unit of work hierarchy (e.g., as illustrated in FIG. 4) and returns 740 the result to the logical unit of work manager 208. Any success or failure to bind the coordination unit to the logical unit of work is communicated 742 back to the application program by the local logical unit of work manager 208. The application program informs 744 the application program (e.g., one of application program(s) 202A, . . . , 202N) at the origin of the interaction. In case of failure, the application program can further decide whether to pursue the logical unit of work or not. As indicated in the exemplary embodiment, any component application program 202A, . . . , 202N, application program 206A, . . . , 206N or repository 210N, . . . , 210Z can initiate or participate in the same sequence of interactions in as many systems 200B, . . . , 200N as it is required.

FIG. 7C illustrates an exemplary embodiment related to the set of possible sequences of interactions during the process stage 604 of the logical unit of work transactional processing. The example illustrates a request from an application program 200 participating in a logical unit of work to initiate 746 any operation on a repository (e.g., one of repositories 210A, . . . , 210N) related to the lifecycle of a digital asset twin as illustrated in the exemplary embodiments of FIGS. 9C, 9D, 9E, regarding constructing, updating or destructing digital asset twins. As indicated in the exemplary embodiment, the application program can initiate the same sequence of interactions with as many systems as it desires, indicated in the FIG. 200A, . . . , 200N. As indicated in the exemplary embodiment, any component application program 202, . . . , 202N, repository 210A, . . . , 210N can initiate or participate in the same sequence of interactions in as many systems 200A, . . . , 200N as it is required.

Figure 7D:
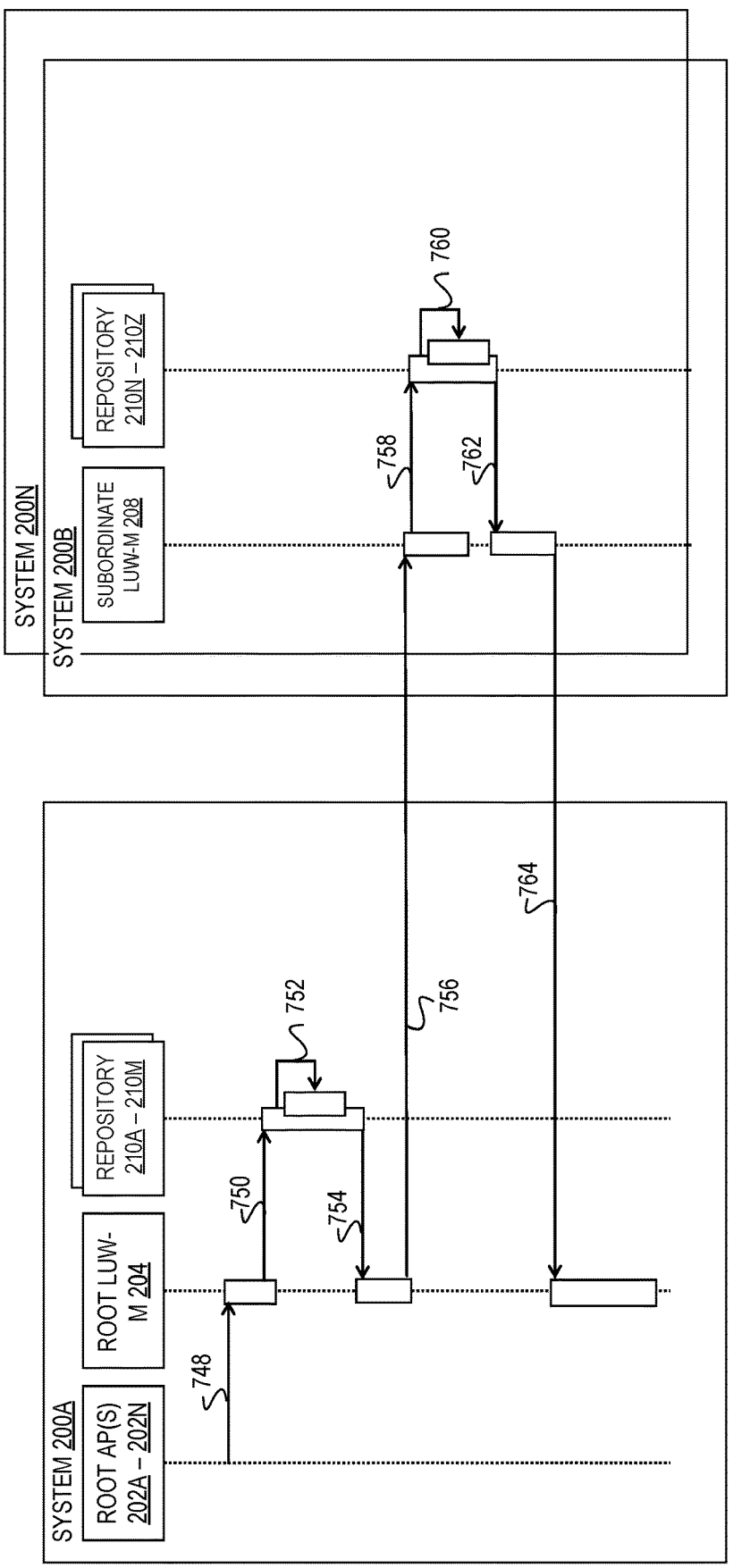
FIG. 7D shows a sequence flow of an exemplary method for preparing completion of a logical unit of work according to some embodiments.

FIG. 7D illustrates an exemplary embodiment related to one possible sequence of interactions 700D during the prepare stage of the logical unit of work transactional processing. The exemplary embodiment involves interactions among logical unit of work managers 204, 208 that coordinate to prepare completion of a logical unit of work managers. More specifically, the root application program (e.g., one of root application program(s) 202A, . . . , 202N) of root system 200A can at any moment initiate a request 748 to commit the logical unit of work. This causes logical unit of work manager 204 to request 750 the repository (e.g., one of repositories 210A, . . . , 210M) to prepare the repository branch related to that logical unit of work (that same call is repeated for all repositories 210A, . . . , 210M of the system 200A). The repository (as well as all relevant repositories 210A, . . . , 210M) locks 752 all digital asset twins participating in that repository branch. Upon successful locking, no further modifications of the state of these digital asset twins are possible until commit or rollback of the logical unit of work. The result of the locking operation is notified 754 to the logical unit of work manager 204. In case of failure, the logical unit of work is rolled back as illustrated in FIG. 7F. The root logical unit of work manager 204 calls 756 the subordinate logical unit of work manager 208 to prepare completion of the logical unit of work in the subordinate system 200B. The subordinate logical unit of work manager 208 in turn requests 758 the repository 210N, . . . , 210Z to prepare the repository branch related to that logical unit of work. The repository 210N, . . . , 210Z locks 760 all digital asset twins participating in that repository branch. Upon successful locking no further modifications of the state of these digital asset twins are possible until commit or rollback of the logical unit of work. The result of the locking operation is notified 764 to the logical unit of work manager 204. In case of failure, the logical unit of work is rolled back as illustrated in FIG. 7F. As indicated in the exemplary embodiment, logical unit of work manager 204 can initiate the same sequence of interactions with all systems that participate in the LUW, indicated in the figure (e.g., with systems 200B, . . . , 200N).

Figure 7E:
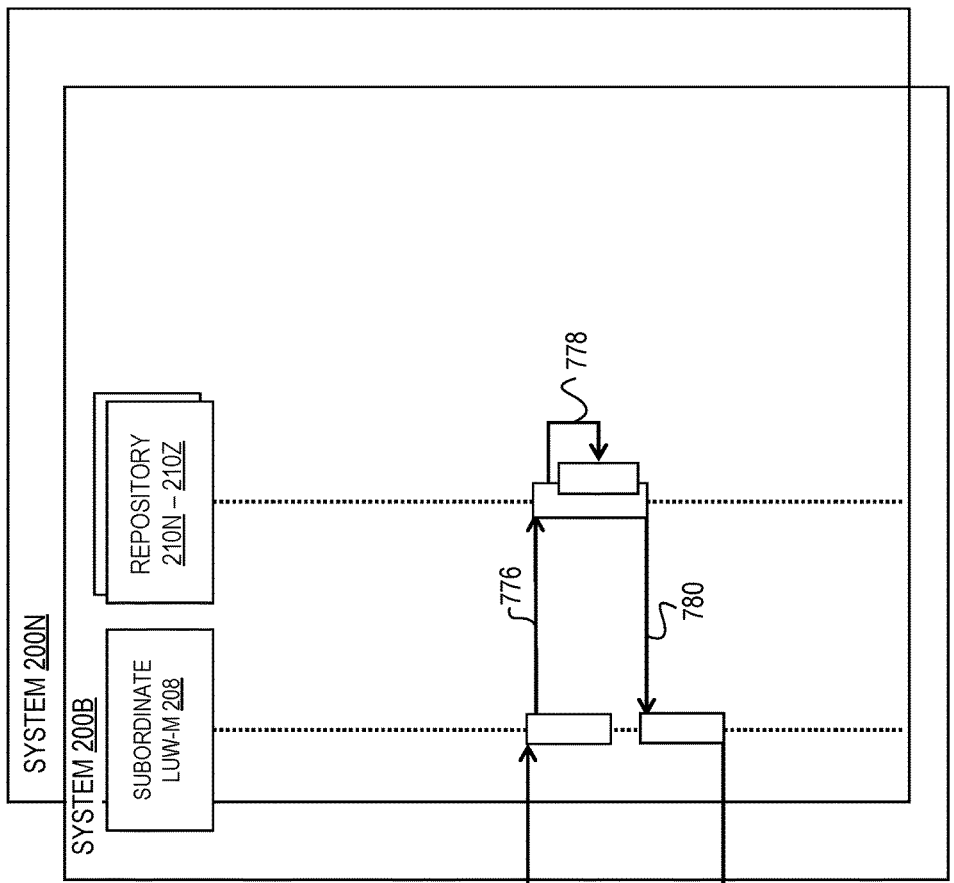
FIG. 7E shows a sequence flow of an exemplary method for committing of a logical unit of work according to some embodiments.
Figure 7F:
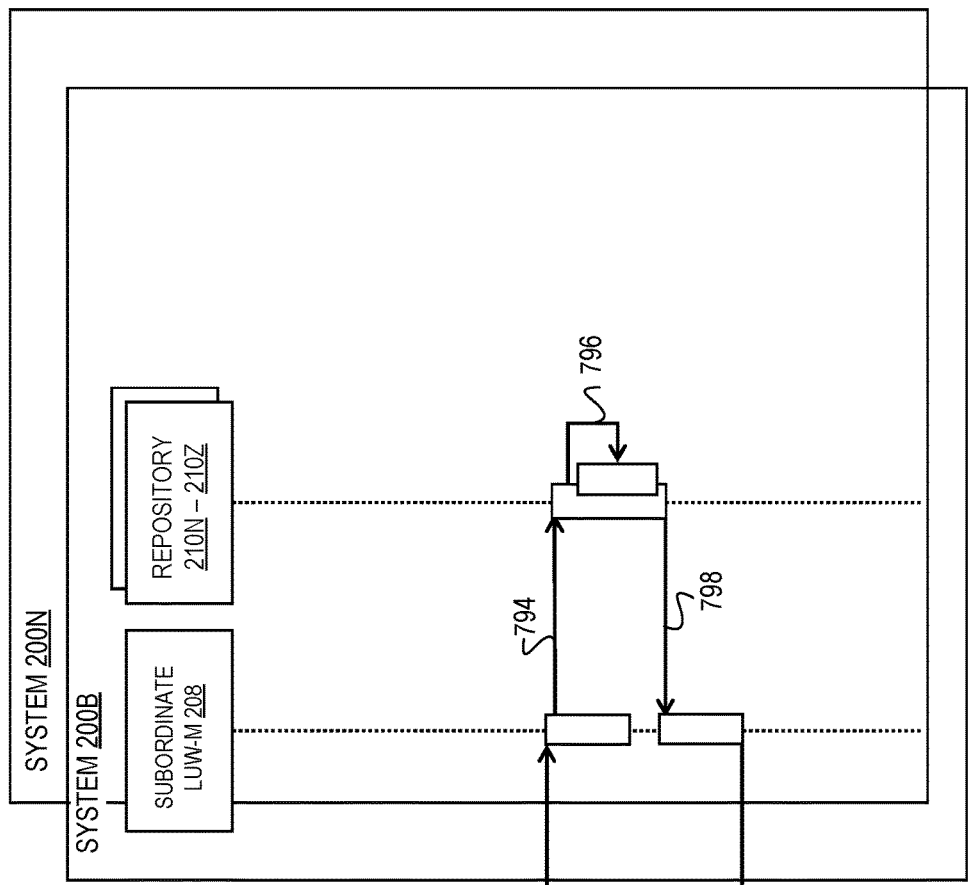
FIG. 7F shows a sequence flow of an exemplary method for rolling back a logical unit of work according to some embodiments.

FIG. 7E illustrates an exemplary embodiment related to one possible sequence of interactions during the commit stage of the logical unit of work transactional processing 700E. The exemplary embodiment involves interactions among logical unit of work managers 204, . . . , 208 coordinating to commit a logical unit of work. More specifically, the sequence starts with a root logical unit of work manager 204 checking 766 for successful return of the prepare stage 606 from all logical unit of work managers participating in the logical unit of work. If ok, the logical unit of work manager 204 requests 768 a repository (e.g., one of repositories 210A, . . . , 210M) to commit the repository branch related to that logical unit of work (that same call is repeated for all repositories 210A, . . . , 210M of the system 200A). The repository (as well as all repositories 210A, . . . , 210M) executes 770 all actions required to align the state of the digital asset twins with the underlying correlated assets (managed by the related asset providers 212A, . . . , 212M). The root logical unit of work manager 204 calls 774 the subordinate logical unit of work manager 208 to commit the logical unit of work in the subordinate system 200B. The logical unit of work manager 208 in turn requests 776 repository (e.g., one of repositories 210N, . . . , 210Z) to commit the repository branch related to that logical unit of work (that same call is repeated for all repositories 210N, . . . , 210Z of the system 200B). The repositories 210N, . . . , 210Z execute 778 all actions required to align the state of the digital asset twins with the underlying correlated assets (managed by the related asset providers 212N, . . . , 212Z). Commit confirmation 780 is returned to logical unit of work manager 208. Once all commit confirmations from repositories are received, logical unit of work manager 208 informs 782 the root logical unit of work manager 204 that the coordination unit of system 200B is committed. As indicated in the exemplary embodiment, the logical unit of work manager 204 can initiate the same sequence of interactions with all systems that participate in the logical unit of work, indicated in the figure (e.g., systems 200B, . . . , 200N).

FIG. 7F illustrates an exemplary embodiment related to one possible sequence of interactions during rollback of the logical unit of work transactional processing. Such situation may occur at any moment during the initialize 602, process 604, or prepare 606 stages. The exemplary embodiment involves interactions among logical unit of work managers 204, 208 coordinating to rollback a logical unit of work. More specifically, the sequence starts with root logical unit of work manager 204 detecting 784 a reason to rollback a logical unit of work. Rollback can occur at any moment before the commit stage. It can be caused by the inability of one of the repository or subordinate logical unit of work manager components participating in the logical unit of work to complete its operations. It might also occur from an explicit request of the root application program that has initiated the logical unit of work. Logical unit of work manager 204 requests 786 a repository (e.g., one of repositories 210A, . . . , 210M) to rollback the repository branch related to that logical unit of work (that same call is repeated for all repositories 210A, . . . , 210M of the system 200A). The repositories 210A, . . . , 210M execute 788 all actions required to revert digital asset twins at the state upon initialization of the logical unit work. The repositories 210A, . . . , 210M inform 790 logical unit of work manager 204 that the repository branch has been rolled back. The root logical unit of work manager 204 calls 792 the subordinate logical unit of work manager 208 to rollback the logical unit of work in the subordinate system 200B. The logical unit of work manager 208 in turn requests 794 a repository (e.g., one of repositories 210N, . . . , 210Z) to rollback the repository branch related to that logical unit of work (that same call is repeated for all repositories 210N, . . . , 210Z of the system 200B). The repositories 210N, . . . , 210Z execute 796 all actions required to revert digital asset twins at the state upon initialization of the logical unit of work. The repositories 210N, . . . , 210Z informs 798 logical unit of work manager 208 that the repository branch has been rolled back. Once all rollback confirmations from the repositories are received, the logical unit of work manager 208 informs 799 the root logical unit of work manager 204 that the coordination unit of system 200B has been rolled back. As indicated in the exemplary embodiment, the root logical unit of work manager 204 can initiate the same sequence of interactions with all systems that participate in the logical unit of work, indicated in the figure (e.g., systems 200B, . . . , 200N).

Figure 8A:
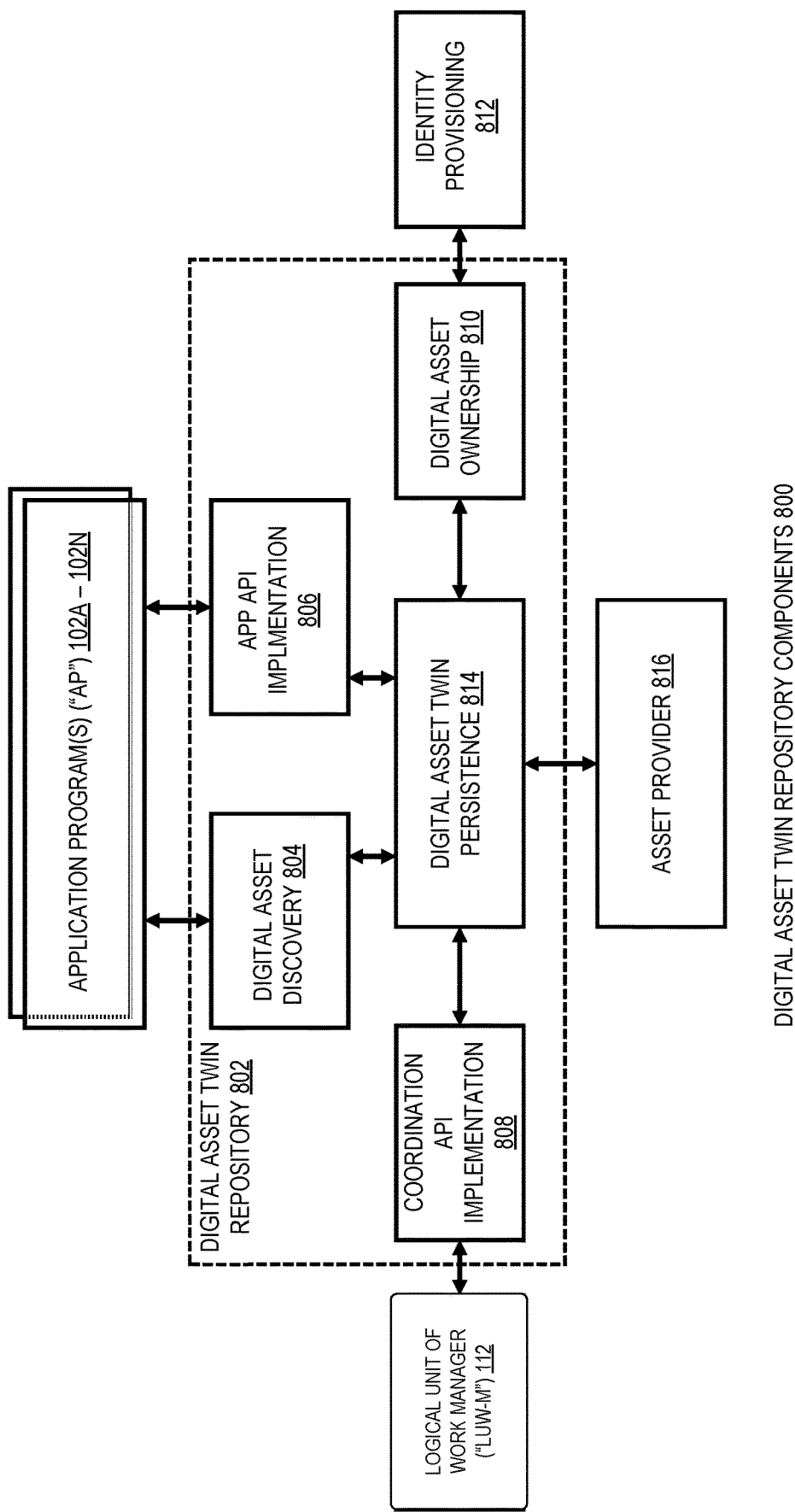
FIG. 8A shows an illustration of the components of a digital asset twin repository according to some embodiments.
Figure 8B:
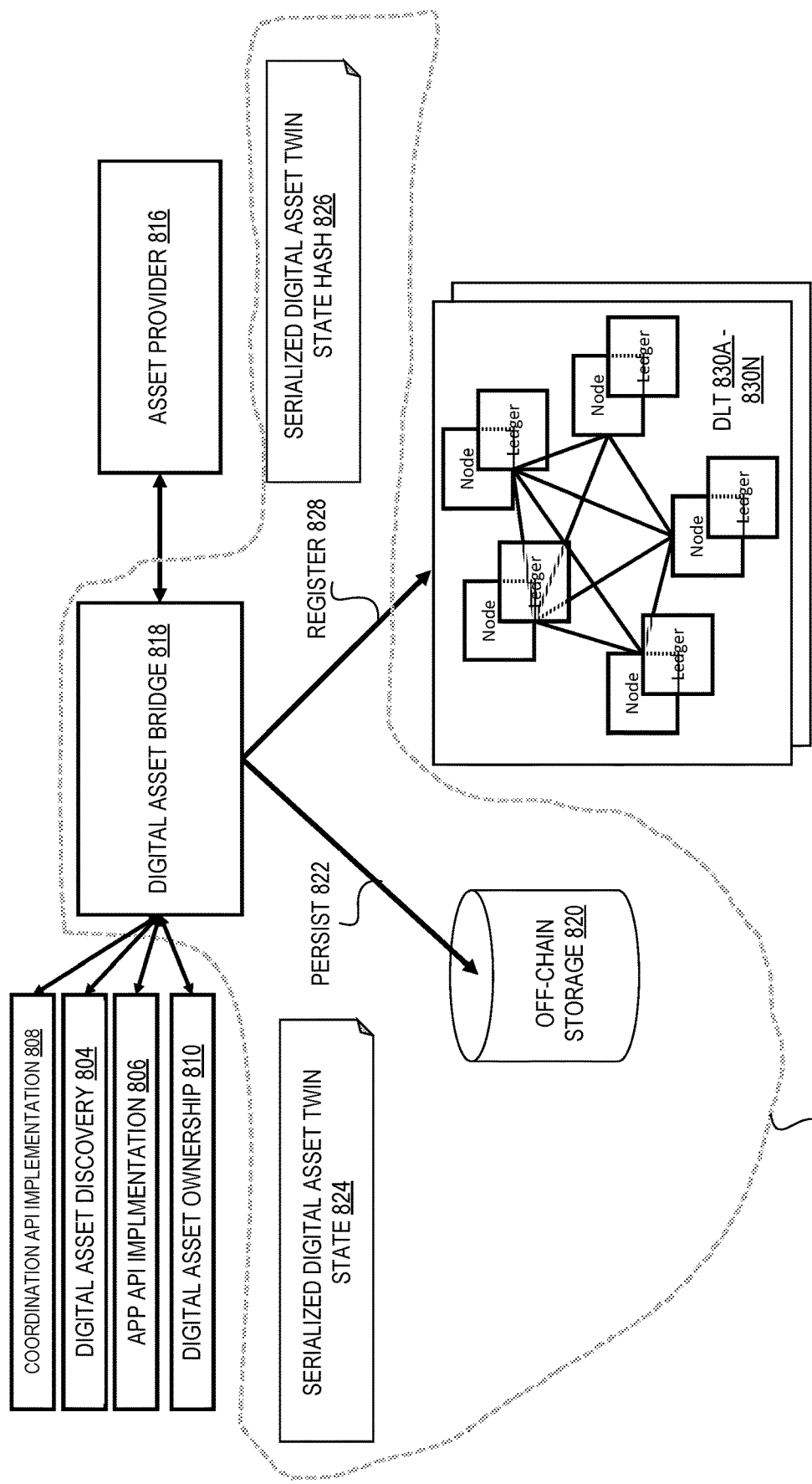
FIG. 8B shows an illustration of example components of a digital asset twin persistence according to some embodiments.
Figure 8C:
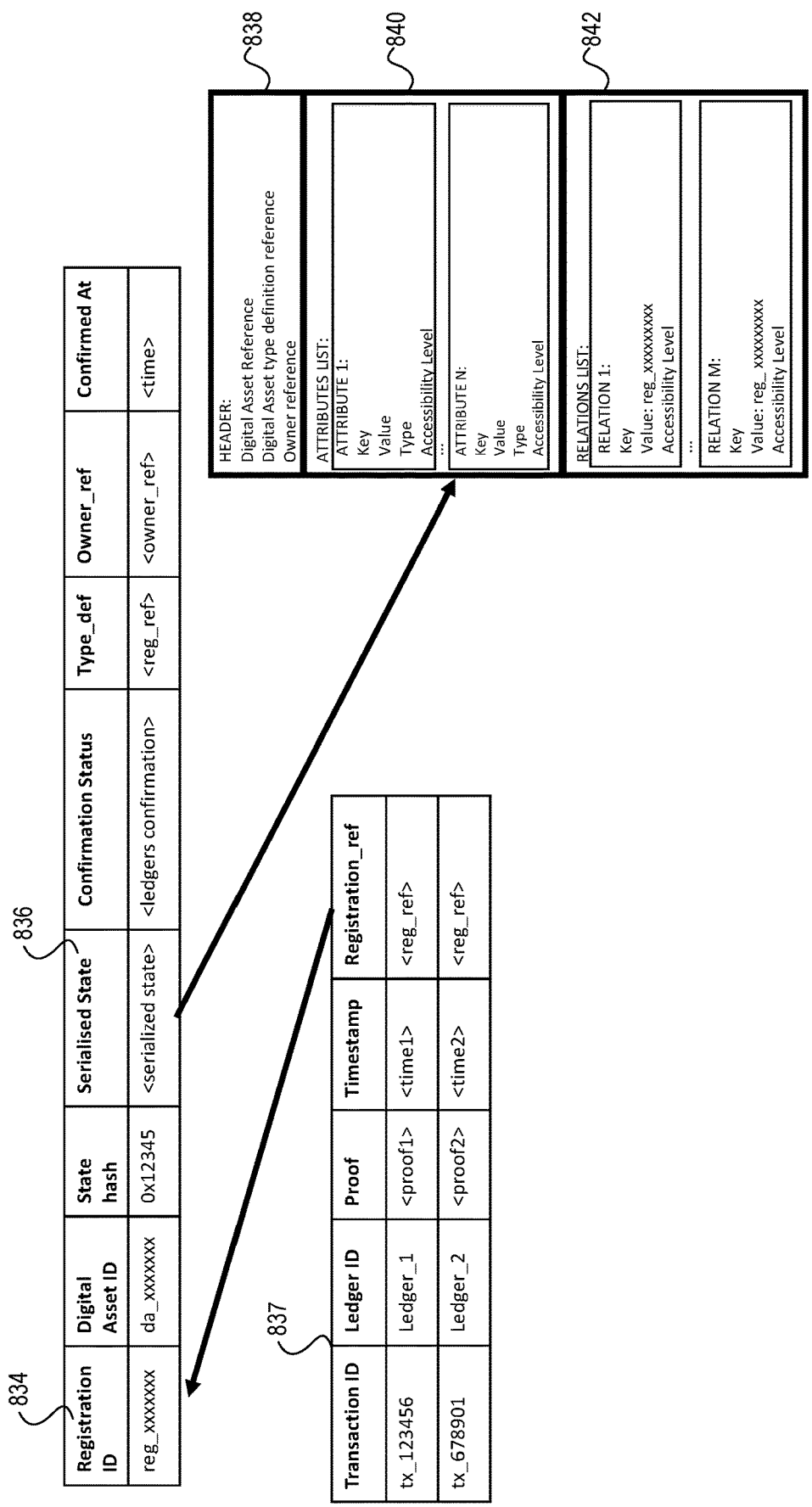
FIG. 8C shows an illustration of an example serialized state of a digital asset twin according to some embodiments.

FIG. 8A illustrates an exemplary embodiment where a digital asset twin repository 802 (e.g., one of digital asset twin repositories 104A, . . . , 104N) is composed of five components (collectively referred to as digital asset twin repository components 800). The digital asset discovery 804 component handles interactions with any application program 102A, . . . , 102N willing to obtain information regarding the assets represented via digital asset twins and managed by the repository 802. The app API implementation 806 component handles interactions between the repository and application programs. It is via this component that an application program submits requests to modify digital asset twins by passing new serialized states of digital asset twins. The calls from an application program to a repository related to a specific logical unit of work, in some embodiments, refer to the specific repository branch associated with that logical unit of work. The coordination API implementation 808 component handles interaction between the repository 802 and the associated logical unit of work manager 112. The logical unit of work manager 112 and repository 802 cooperate to initiate a logical unit of work by associating a repository branch to a coordination unit during the initialization stage of the logical unit of work transactional processing. Interactions between the logical unit of work manager 112 and the repository 802 occur during the prepare 606 as well as the commit 608 stages, or in case of rollback as illustrated in FIGS. 7A, 7B, 7C, 7D, 7E, 7F. The digital asset ownership 810 component interacts with the identity provisioning component 812 to handle authentication, authorization, and any other aspect related to asset owners and digital asset twins. The central component repository's architecture is the digital asset twin persistence 814 component. This component, further illustrated in FIG. 8B, manages the complete life cycle of digital asset twins and their correlation with the underlying assets. For this, it interacts with all other components described above, as well as with the associated asset provider 816.

FIG. 8B illustrates an exemplary embodiment further detailing the digital asset twin persistence 814 component. In some examples, the digital asset persistence 814 component is composed of a digital asset bridge 818 component and an off-chain storage 820 component. The digital asset bridge 818 interacts with the asset provider 816 to correlate digital asset twins with assets. More specifically, the digital asset bridge 818 may eventually request the asset provider 816 to reserve assets at the beginning of a logical unit of work. This is done to ensure that, if applicable, the operation that would be operated by the digital asset twins leading to creation or modification of correlated assets, is successful in case the logical unit of work commits. In the event the logical unit of work rolls back, the digital asset bridge 818 instructs the asset provider 816 to release any reserved asset while reverting all correlated digital asset twins to their state before the initialization of the logical unit of work. Both the asset provider 816 and the off-chain storage 820 implement transactional persistence of digital asset twins and assets respecting ACID properties (Atomicity, Consistency, Isolation, Durability). This does not mean that ACID properties must be natively implemented by the underlying technical storage mechanism (e.g., an RDBMS) but, in some embodiments, the behavior of both components exhibit ACID transaction properties. When a digital asset twin is about to be stored, the digital asset bridge 818 verifies that the new state is consistent according to a set of well-defined state-transition rules (as further illustrated in FIG. 9B) and then persists 822 the digital asset twin. The action of persisting a digital asset twin in the context of a logical unit of work encompasses the action of serializing the state 824 of the digital asset twin (as further illustrated in FIG. 8C); storing it in off-chain storage 820; cryptographically hashing the serialized state of the digital asset twin 826; and registering (timestamping) 828 that hash on one or more distributed ledger technology (DLT)-enabled storage mechanisms 830A, . . . , 830N. In some examples, any unrecoverable error in any of these actions that prevents the digital asset bridge from persisting the state of the digital asset twin causes global rollback of the logical unit of work.

FIG. 8C illustrates an exemplary embodiment describing on possible way of persisting the state of a digital asset twin 832. In some embodiments, a digital asset twin stored in off-chain storage 820 is persisted as a set of records. A possible information contained in such records includes among other information, a registration identifier 834 of the specific state of the digital asset twin ("Registration ID"), a non-ambiguous reference to the correlated asset ("Digital Asset ID") the serialized form of the state 836 the global status of the confirmation from all DLT that registered the hash of that serialized state a reference to the owner of the asset and a confirmation time. A series of records 837 related to the identifiers of the transactions that registered the serialized state has of the digital asset twin on the various DLTs 830A, . . . , 830N can also be persisted together with the confirmation time and any proof information to be able to reconstruct the relation between the transaction information and the hash of the serialized state of the digital asset twin. In some examples, a serialized state of the digital asset twin can contain three sections: a header section 838 with references to the unique identifier of the digital asset twin; a semantic description of the digital asset twin in terms of an ontology or any other class-level declarative means capturing semantic aspects of the digital asset twin state, including but not limited to information about the ontological definition of the digital asset twin, as well as all the constraints that have to be verified to transition from a state to another state, for example, in terms of design by contract definitions with pre/post conditions and invariants; an unambiguous reference to the owner of the correlated asset or any other authorization information to allow consistent modification of the digital asset twin according to strict ownership rules. An attributes section 840 maintaining the list of key, value, type, and accessibility level (for example public, protect, private) elements for each attribute. An attribute can be any aspect of the asset that might be relevant for an application program in the context of a logical unit of work. Examples of attributes include but are not limited to tracking numbers, IoT device addresses, amounts/quantities, units of measurement, or any other information that could be captured by an object-oriented model of the real-world concept of asset that is relevant to be represented as digital asset twin. A relations section 842 maintains a list of key, value, and accessibility level (for example public, protect, private) elements for each relation. The value of a relation is a reference to another serialized of a digital asset twin. Typically, a relation may be the reference on other digital asset twins that are part of the logical unit of work hierarchy 400 illustrated in FIG. 4, or any other type of relation among digital asset twins. For example, references in the header section can also be implemented via relations to digital asset twins representing ontology definitions or owner identities. As there is no limitation on the type of assets that can be represented as digital asset twins, any relevant asset or event of the real world could be represented by a digital asset twin. Some digital asset twins can participate in a logical unit of work by exhibiting transactional behavior but there might be digital asset twins representing facts, events, or other aspects of the physical world that can participate in a logical unit of work as any other transactional digital asset twin.

Figure 8D:
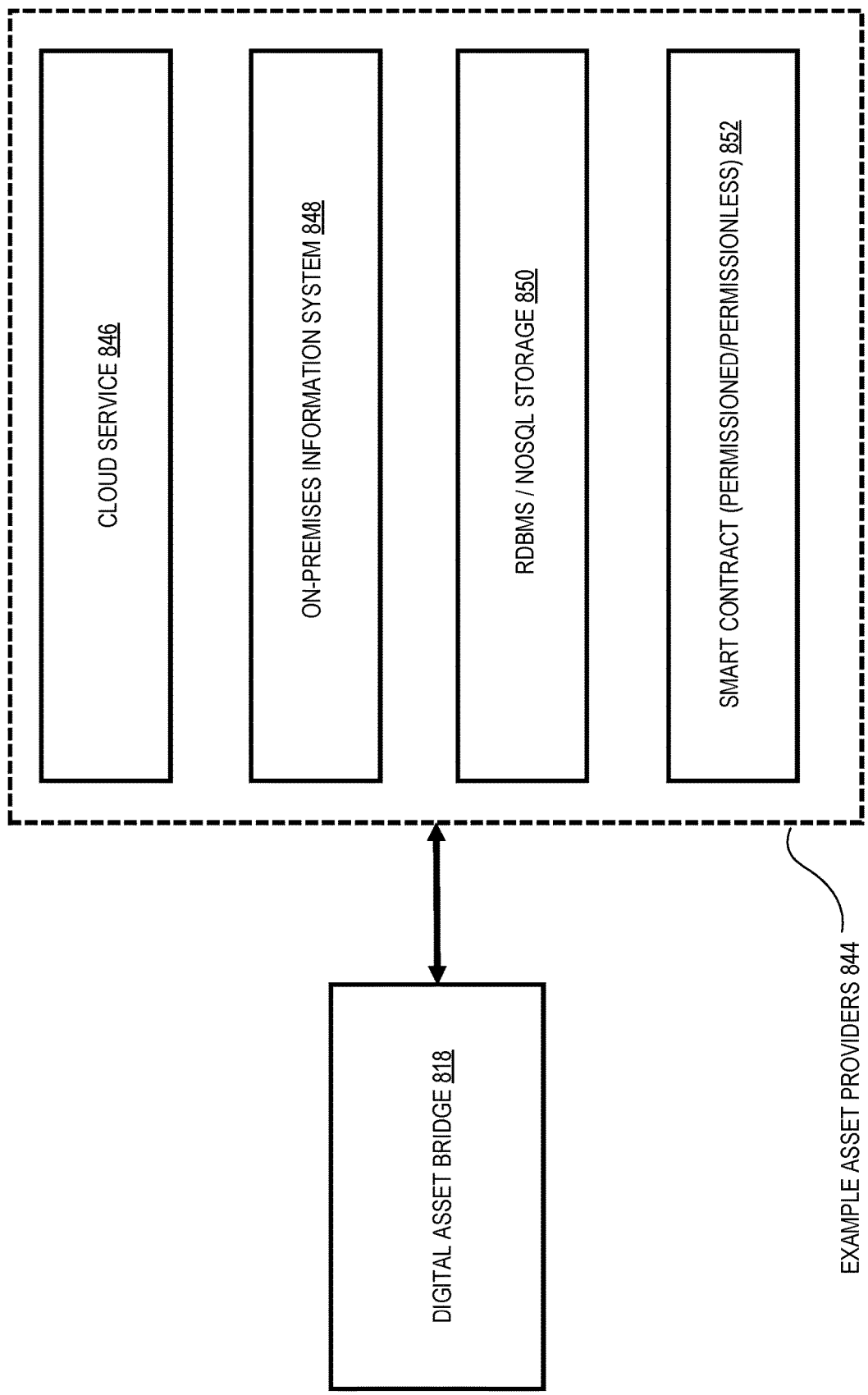
FIG. 8D shows an illustration of example asset providers participating in a decentralized processing system according to some embodiments.

FIG. 8D illustrates an exemplary embodiment describing a non-limiting list of potential asset providers 844. These can range from services accessible over the internet or other publicly accessible network 846, on-premises information system 848 including but not limited to ERP, Back Office Systems, Front Office Systems, MIS, or any other type of enterprise software, data stores 850 of any kind including but not limited to RDBMS or NoSQL databases, smart contracts 852 holding crypto currencies, token, or any other natively digital blockchain-based asset. Architecturally, some of the above systems can provide native support for ACID transactions. Some others that do not offer native support for ACID transactions can simulate ACID transaction behavior especially regarding temporary blocking of assets for the duration of a logical unit of work with the possibility to rollback or commit these assets based on the instructions received by the associated repository.

Figure 8E:
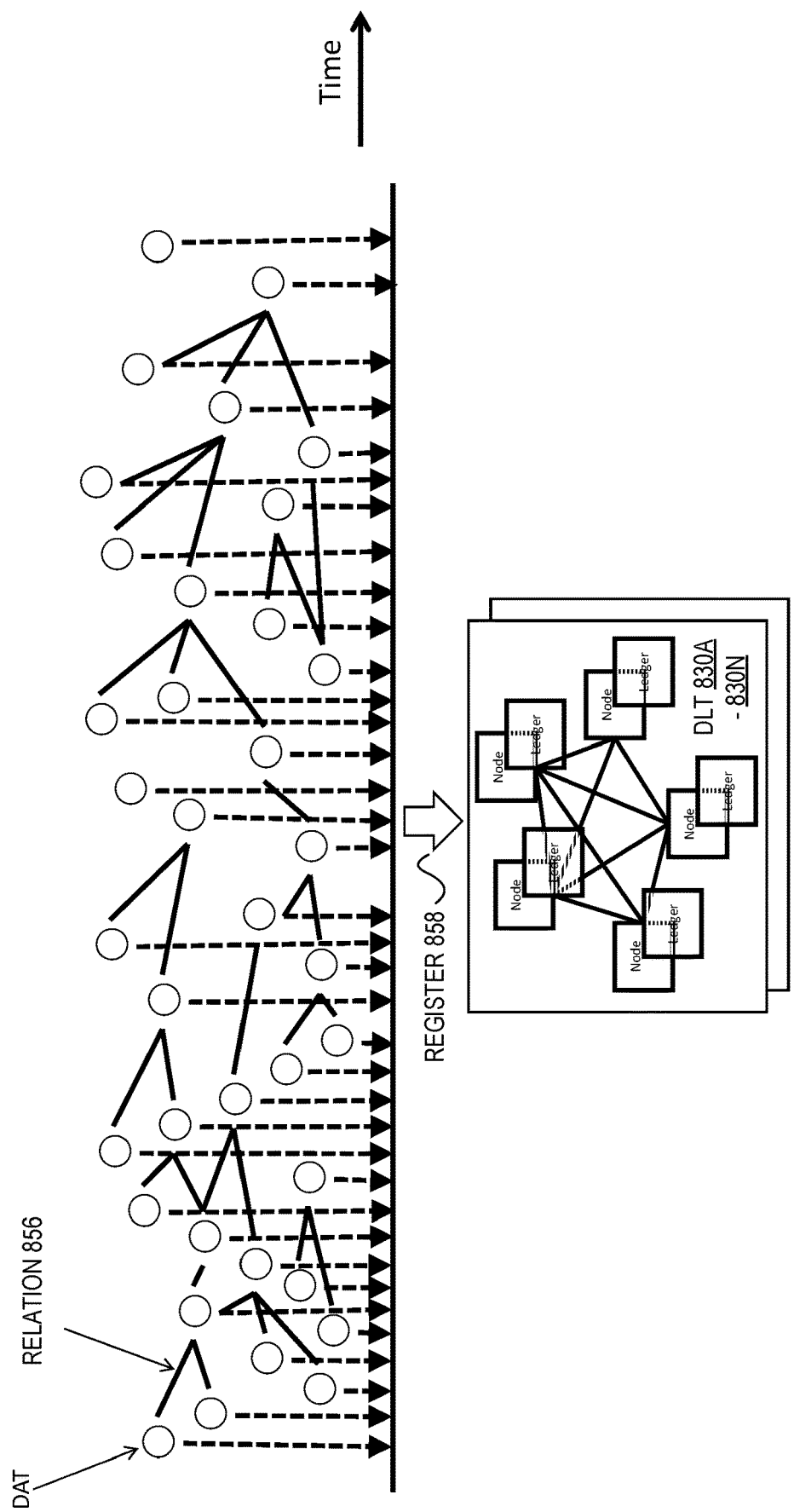
FIG. 8E shows an illustration of an example graph of a digital asset twin according to some embodiments.

FIG. 8E illustrates an exemplary embodiment describing a graph of relations among digital asset twins 854. In some examples, a digital asset twin contains relations 856 to other digital asset twins previously registered 858 by the digital asset twin persistence 814 component. In some embodiments, the registration 858 can be performed simultaneously to several DLTs 830A, . . . , 830N. Examples of relations include but are not limited to: link to previous versions after update of a digital asset twin; logical groupings of digital asset twins that participate to a repository branch; composite digital asset twins consisting of many digital asset twins managed by the same repository (e.g., one of digital asset twin repositories 104A, . . . , 104N) or by repositories from remote systems (e.g., remote systems 200B, . . . , 200N).

Figure 9A:
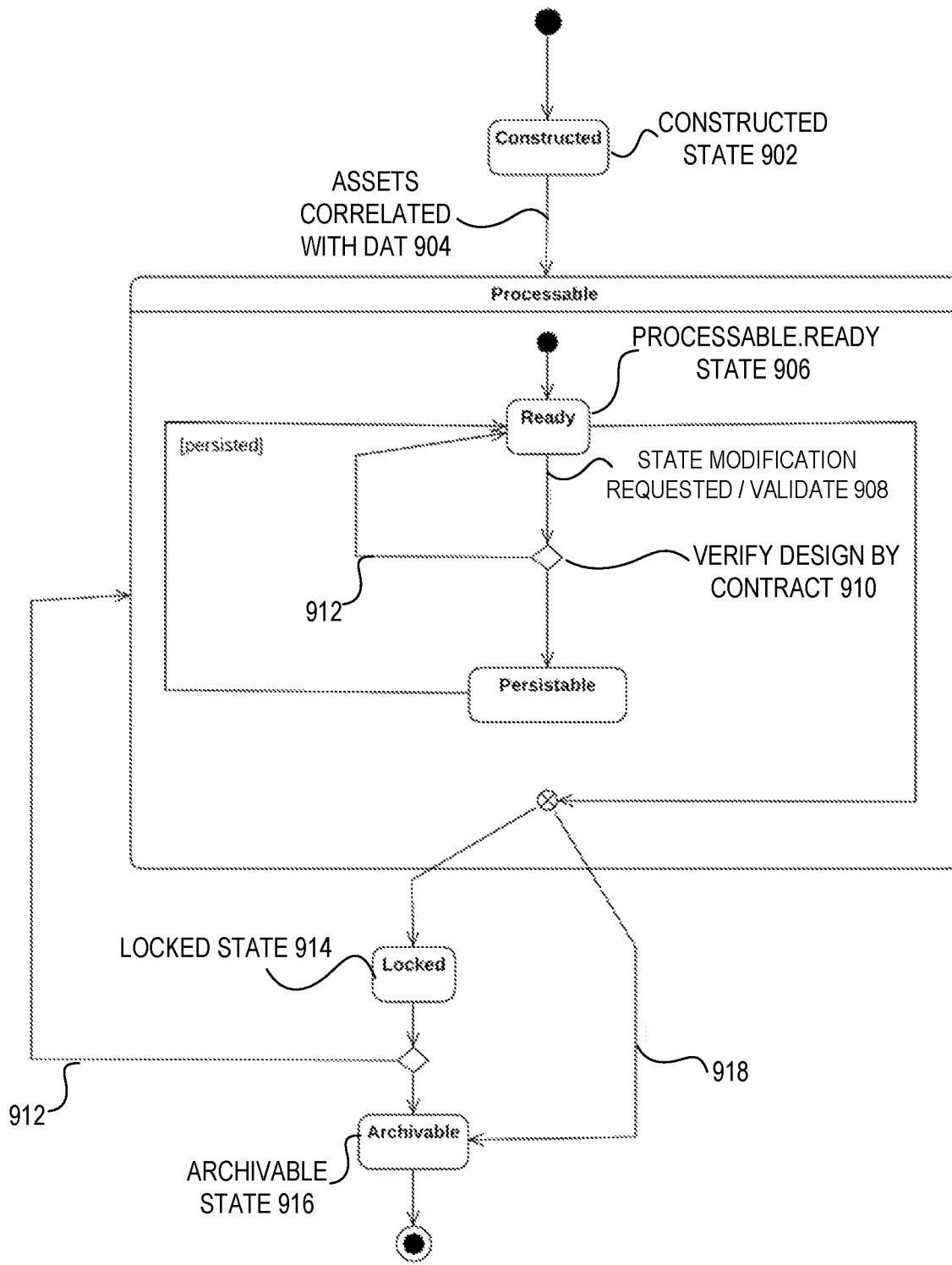
FIG. 9A shows an illustration of a state chart flow of an exemplary method for the transition of states of a digital asset twin according to some embodiments.

FIG. 9A illustrates an exemplary embodiment describing a possible life cycle 900 of a digital asset twin in the form of a state chart diagram. Upon creation, the digital asset twin is in constructed state 902. At that state, the repository communicates with the asset provider to reserve assets that eventually are correlated with the digital asset twin 904. When the assets get correlated asset to the digital asset twin, the digital asset twin moves to Processable.Ready state 906. From that moment on, the digital asset twin can have any meaningful additional domain-related state as defined and modified 908 by an application program (it is assumed that any application program 102A, . . . , 102N from any subsystem 100, 200B . . . , 200N can perform such operation). When an application program desires to modify the domain-related state of the digital asset twin in the context of a logical unit of work, it sends the serialized new state to the repository. The new state is passed to the digital asset twin, which verifies 910 whether the design by contract specifications for the current and future state (requested by application program) are met. If the verification fails 912, the state modification is not performed, and the digital asset twin returns to Processable.Ready state 906. If the verification succeeds, the state is modified to the state requested by the application program and the digital asset twin returns to Processable.Ready state 906. The cycle of verifications continues for the duration of the logical unit of work orchestrated by the repository. In the case where the logical unit of work moves to prepare stage 606, the repository locks the digital asset twins participating in the logical unit of work. In such case, the state of the digital asset twin becomes locked 914. When the repository unlocks the digital asset twin, the digital asset twin checks whether the asset has been consumed or whether the digital asset twin is still correlated to the underlying asset. In the case that the digital asset twin is still correlated, it moves 916 to Processable.Ready state 906. If the digital asset twin is no longer correlated, it moves to archivable state 916. It is of course possible for a repository to force decorrelation of assets from a digital asset twin. In such case, the digital asset twin state moves 918 to archivable state 916.

Figure 9B:
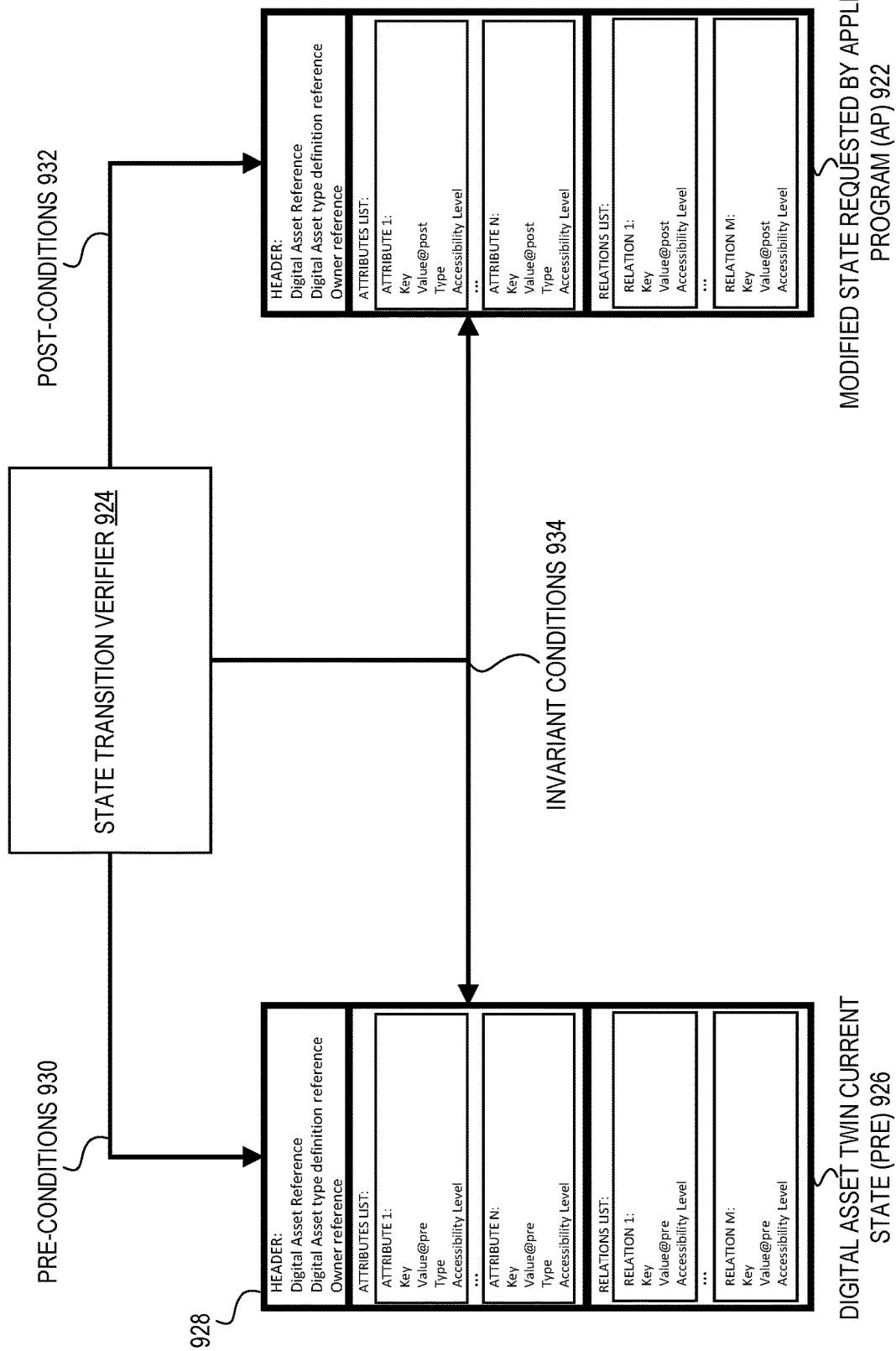
FIG. 9B shows a flow of an exemplary method for verifying the transition of states of a digital asset twin according to some embodiments.

FIG. 9B illustrates an exemplary embodiment describing a possible verification method of digital asset twin state transitions 920. In some examples, verification is triggered when an application program submits a new modified state named "post" state 922. When verification is triggered by the verifier 924, the digital asset twin is in its current state, named "pre" state 926. Both "pre" and "post" states are serialized states 928. One approach for verification is based on the design by contract method. Such method evaluates pre-conditions 930 on attributes of the "pre" state (checks include but are not limited to specific conditions on the values of attribute, for example, minimum quantities, or presence of certain type of attributes like contract number, or order number). It also evaluates post-conditions 932 on attributes of the "post" state. Additional invariant conditions 934 verify that some values of some attributes or a combination of values of attributes in "pre" and "post" states remain unchanged. If a pre, post, and invariant conditions are verified, the digital asset twin can modify its state. The "post" state above becomes the current state and is persisted by the digital asset bridge 818 as illustrated in FIG. 8B.

FIG. 9C illustrates an exemplary embodiment related to the set of possible sequences of interactions related to the construction of a digital asset twin. An application program 936 initiates a request 938 for construction on repository 940. The repository 940 checks 942 the authenticity of the application program 936 (or the user via the application program 936) by calling the identity provisioning 944 component. The identity provisioning 944 component delegates 946 some aspects of authentication to an identity provider 948, which after successful authentication 950 confirms the identity of the application program (or user of the application program). The result is returned 952 to the repository 940. The repository 940 then creates 954 the digital asset twin 956, persists 958 the digital asset twin state (e.g., as shown by persist 822 in FIG. 8B) and registers 960 the hash of the serialized state on DLTs (e.g., as shown by register 828 in FIG. 8B).

The repository 940 then sets 962 the state of the digital asset twin to constructed (e.g., the constructed state 902 shown in FIG. 9A). The repository 940 communicates 964 with the asset provider 966 to reserve assets and to correlate them with the digital asset twin. The asset provider 966 confirms 968 reservation of assets. The repository 940 sets 970 the reference to assets on the digital asset twin. The repository 940 then sets 972 the state of the digital asset twin to Processable.Ready. At that moment, the repository 940 returns a copy by value 974 of the digital asset twin to the application program 936. The copy by value ensures that any modification of the digital asset twin by the application program 936 would only be local to the application program 936 and only take effect after submission by the application program 936 and verification of the validity of the state transition by the repository 940. As indicated in the exemplary embodiment, any component application program, repository, identity provisioning, identity provider, or asset provider can initiate or participate in the same sequence of interactions in all systems participating in a logical unit of work.

Figure 9D:
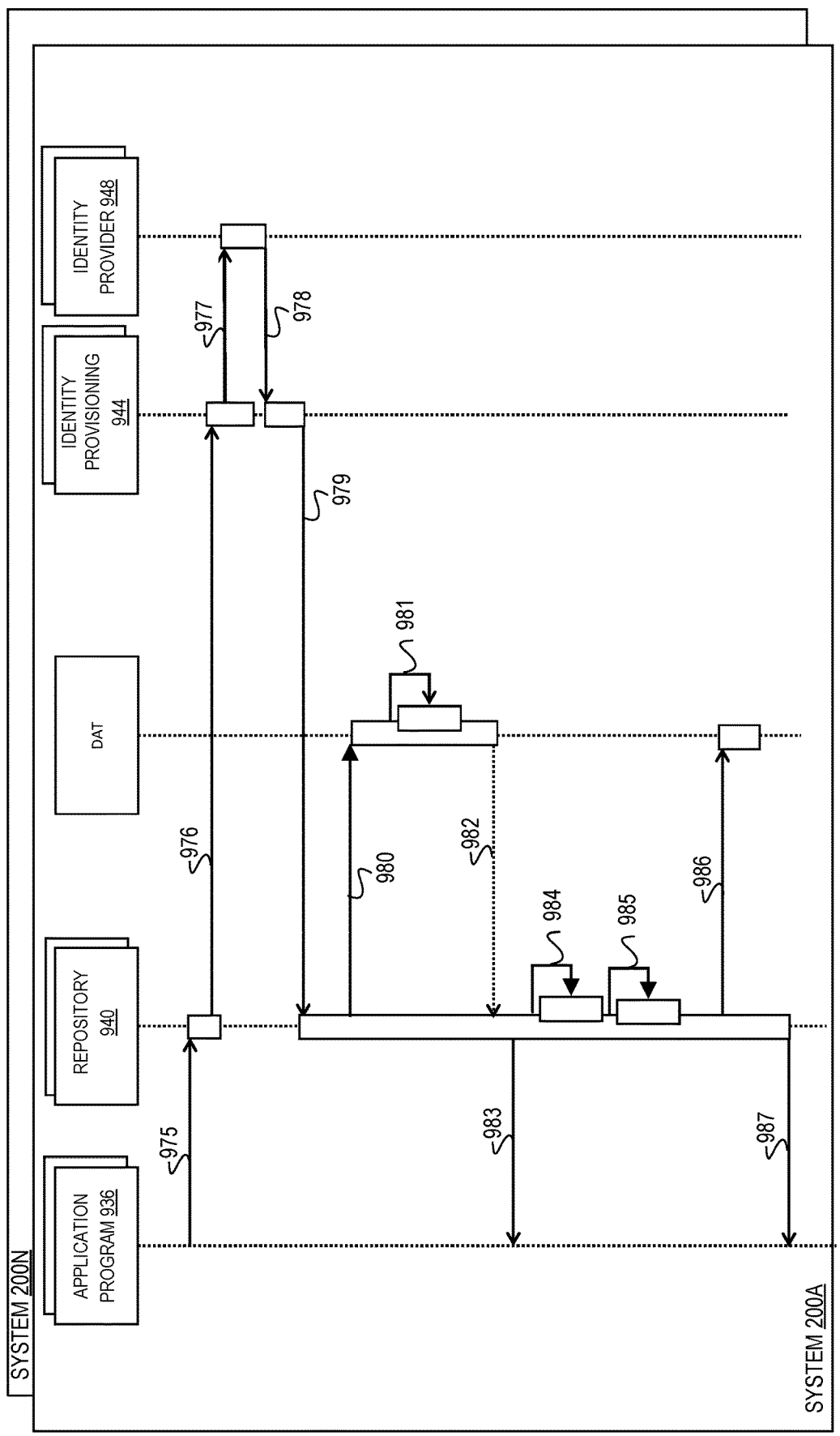
FIG. 9D shows a sequence flow of an exemplary method for modifying a digital asset twin according to some embodiments.

FIG. 9D illustrates an exemplary embodiment related to the set of possible sequences of interactions related to a modification of a digital asset twin. The application program 936 initiates 975 a request for modification of a digital asset twin repository 940 as part of a logical unit of work. The repository 940 checks 976 the authenticity of the application program (or the user via the application program) by calling the identity provisioning 944 component. Identity provisioning 944 delegates 977 some aspects of authentication to an identity provider 948, which after successful authentication, confirms 978 the identity of the application program (or user of the application program). The result is returned 979 to the repository 940. The repository 940 calls 980 the digital asset twin to verify whether the submitted state of the digital asset twin by application program 936 is valid. If the submitted state is valid, the state of the digital asset twin moves 981 to Processable.Persistable. In case the operation fails 982, the application program 936 gets notified 983 by the repository 940. If ok, the repository 940 persists 984 the digital asset twin state and registers 985 the hash of the serialized state on DLTs. The repository 940 then sets 986 the state of the digital asset twin to Processable.Ready. A confirmation of the state modification is then sent 987 to the application program 936.

Figure 9E:
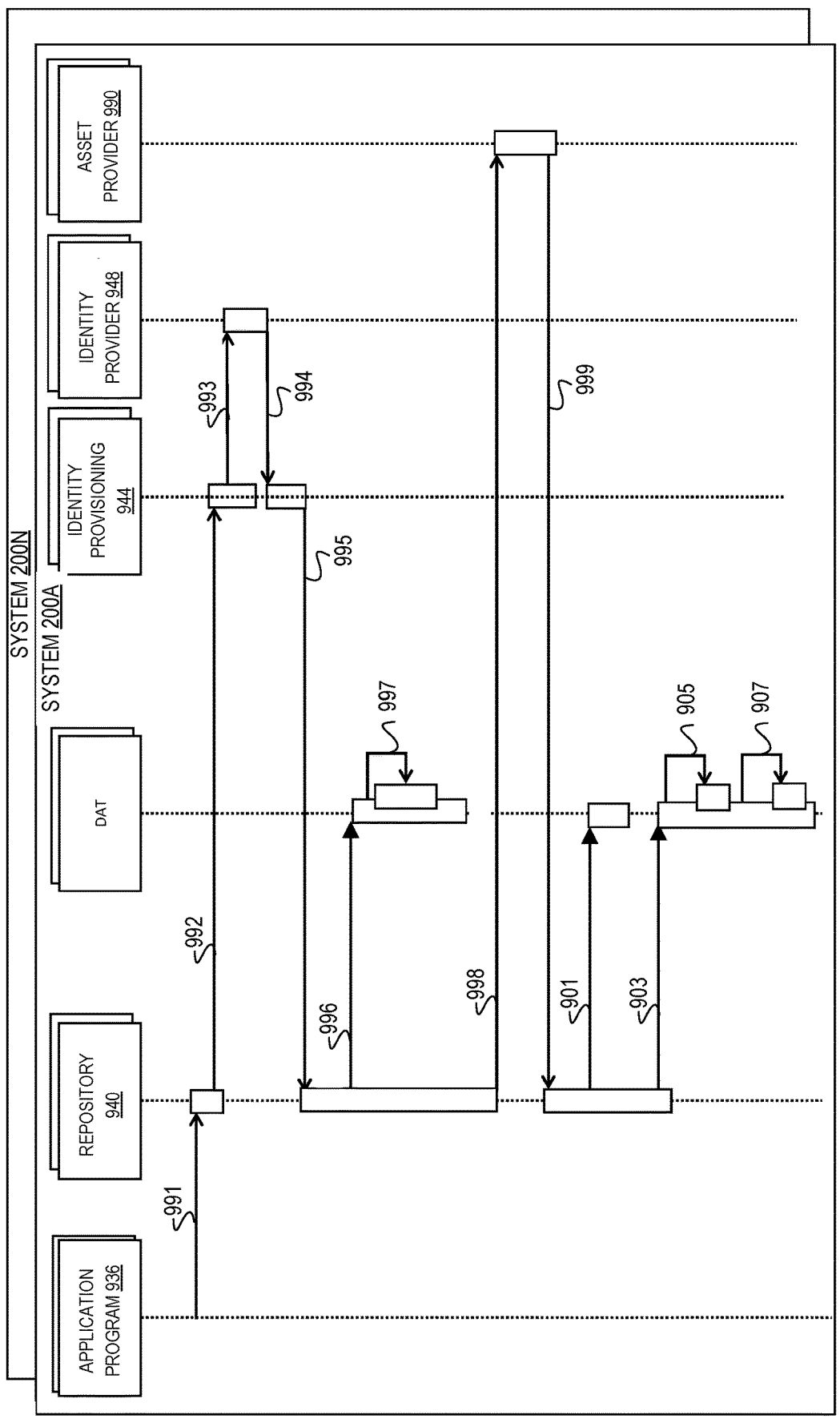
FIG. 9E shows a sequence flow of an exemplary method for destructing a digital asset twin according to some embodiments.

FIG. 9E illustrates an exemplary embodiment related to the set of possible sequences of interactions related to the destruction of a digital asset twin. The application program 936 initiates 991 a request for destruction at a given digital asset twin in the context of a logical unit of work by passing a reference of that digital asset twin to the repository 940. The repository 940 checks 992 the authenticity of the application program 936 (or the user via the application program 936) by calling the identity provisioning 944 component. The identity provisioning 944 delegates 993 some aspects of authentication to an identity provider 948, which after successful authentication 994 confirms the identity of the application program (or user of the application program). The result is returned 995 to the repository 940. The repository 940 then locks 996 the digital asset twin. The digital asset twin set 997 its state to locked. The repository 940 communicates 998 with the asset provider 990 to consume (destruct, decorrelate) the assets. The asset provider 990 confirms 999 decorrelation of assets repository 940, which removes 901 the reference to assets from the digital asset twin. The repository 940 then unlocks 903 the digital asset twin. The digital asset twin checks 905 whether the correlated assets were consumed. Then, it sets 907 its state to archivable. As indicated in the exemplary embodiment, any of the components (application program, repository, digital asset twin, identity provisioning, identity provider, asset provider) can initiate or participate in the same sequence of interactions in all systems participating in a logical unit of work.

Figure 10:
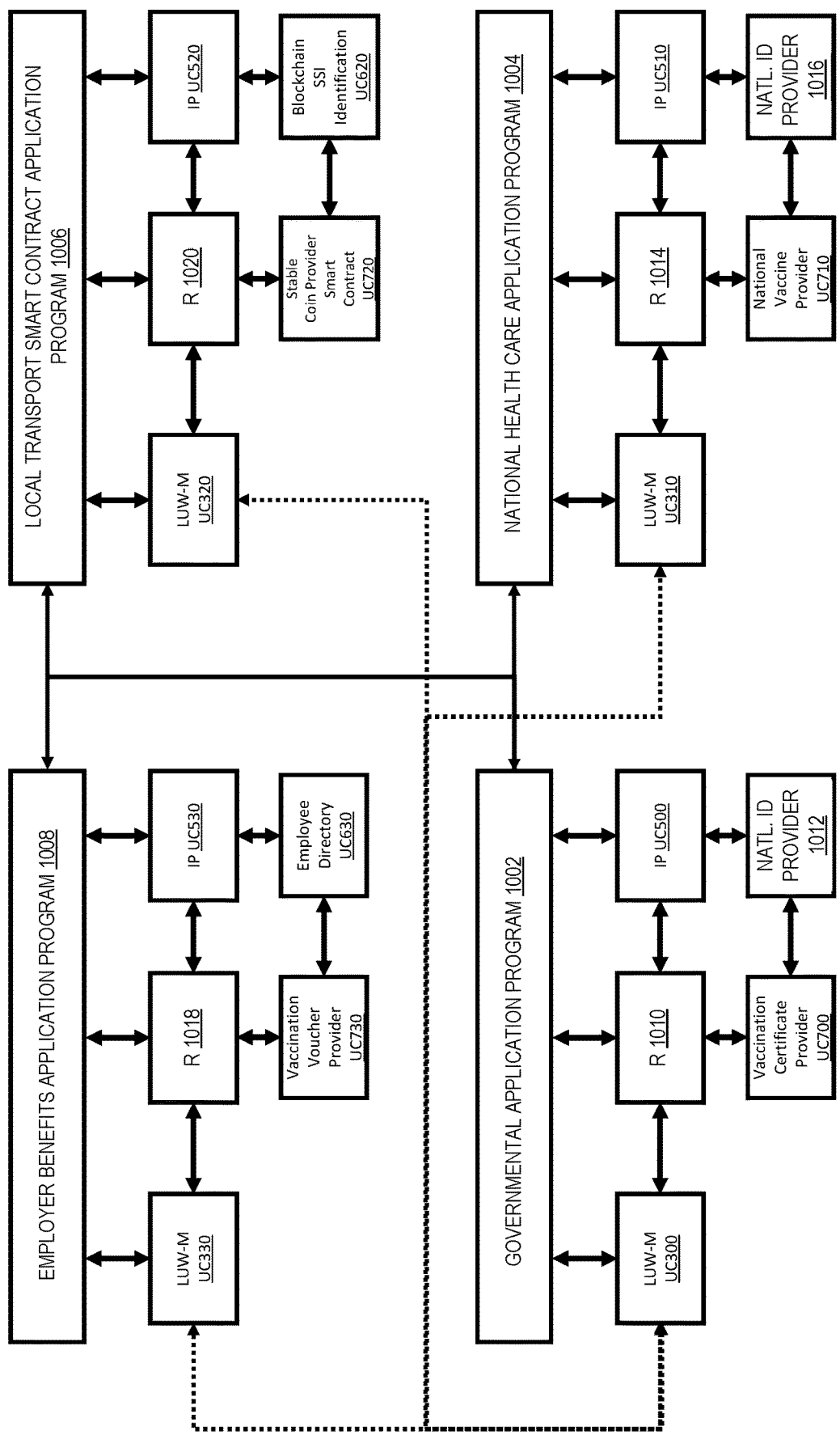
FIG. 10 shows an illustration of an example use case implementing the transactional logical unit of work according to some embodiments.

FIG. 10 illustrates an exemplary embodiment related to one possible use case 1000. The present disclosure is by no means limited to the specific use case presented below. The use case 1000 is presented here as one possible implementation of one possible scenario of use of the described embodiments. The use case relates to an employee in a front-line personnel role having a priority voucher from his employer to get a vaccination. The person lives in an insular area and must move to the vaccination center to get the vaccine. In this scenario, it is assumed that a local transport company financially supports the persons who are obliged to move to the vaccination center.

In the described use case, the components include: a governmental application AP 1002 delivering vaccination certificates. In the described use case, this application program acts as the root application program. For the sake of simplification, it is assumed that application program 1002 has already established interaction via APIs with the other applications of the use case, namely, application program 1004, application program 1006, application program 1008. The application program 1002 interacts with the digital asset provider 1010 that manages vaccination certificates for citizens. Identity-related aspects are handled by the national identification provider for citizens 1012.

Another governmental application program 1004 that is part of the national healthcare system and maintains the link between a person and the serial number of the vaccine received by that person. This is, for example, to track side-effects of the vaccine or any other complication. The application program 1004 interacts with the digital asset provider 1014 that manages the national vaccine repository as well as the personal health file for citizens. Identity-related aspects are handled by the national identification provider for citizens 1016 (can be the same as for the digital asset provider 1010).

An application program 1008 implemented by the employer of the person and is interfacing with application program 1002 to manage priority vouchers for professionals that are front-line personnel. Application program 1008 interacts with the digital asset provider 1018 to maintain the vouchers generated and consumed by the company. Identity-related aspects are handled by company's own identity mechanism, for example based on LDAP technology.

A blockchain-based application program 1006 implemented by the local transport company that delivers stable coins that entitle their owners to buy travel tickets. Application program 1006 interfaces with application program 1002 to give free stable coins to vaccinated professionals that are obliged to travel to the vaccination center. The application program 1006 interacts with the digital asset provider 1020 to maintain the wallets of stable coins. Identity-related aspects are handled by a proprietary SSI identity mechanism implemented for the specific blockchain.

Upon vaccination, a logical unit work is initiated by application program 1002. During the logical unit of work, digital asset twins are created: A digital asset twin by R 1010 to manage creation of the vaccination certificate; A digital asset twin by repository 1014 to manage creation of the vaccination record in person's digital health file including a reference to the specific vaccine serial number; digital asset twin by repository 1020 to manage addition of stable coins to person's wallet; a digital asset twin by repository 1018 to manage the destruction of the voucher.

If the operations during the logical unit of work are successful, the following actions are completed in an atomic way: the vaccination certificate gets generated; the specific vaccine serial number is associated to the person as a record in person's electronic health file; a stable coin from a local transport company is credited to the person's wallet; the employer voucher gets consumed (is destructed and it could never be reused).

Examples

Example #1: A set of mediating computer systems that acts in unison to correlate asset in the real world with the Digital Asset representations on a decentralized network of nodes implementing a shared ledger database. Changes in the state of an asset in the real-world or its digital representation on the shared decentralized ledger is propagated through these mediating computer systems (and vice versa). The consistency of the state between the real-world asset and the digital representation is perpetually maintained using these mediating computer systems.

Example #2: The mediating computer systems performs validation of the real-world asset by interacting with legal entities authorized to hold and manage either the asset itself or the certificates of ownership of the real-world asset. This validation is performed whenever a new digital representation is to be created on the shared ledger for a given real-world asset. Validation is also performed whenever state changes occur on the shared ledger to the asset digital representation.

Example #3: The mediating computer systems may also retain and manage its own digital representation of a real-world asset. In this configuration the shared decentralized ledger only carries the minimal information regarding the asset, such as the cryptographic hash of the digital asset, time of creation, time of last state change, the identity of entities performing these changes.

Example #4: The mediating computer systems facilitate, coordinate and monitor state changes on multiple digital asset representations by employing a transactional logical unit of work (or "LUW"), which may be composed of one or more smaller (simpler) transactions to be applied to the digital asset. There are various ways to represent the logical unit of work, including a hierarchical tree of unit of work transactions. In order for state to be perpetually consistent between a real-world asset and its digital representation on the shared decentralized ledger, the logical unit of work must be carried out as an atomic task (either all parts or sub-tasks succeed, or no state change must occur if any part of the unit of work fails to complete).

Implementation Mechanism—Hardware Overview

Figure 11:
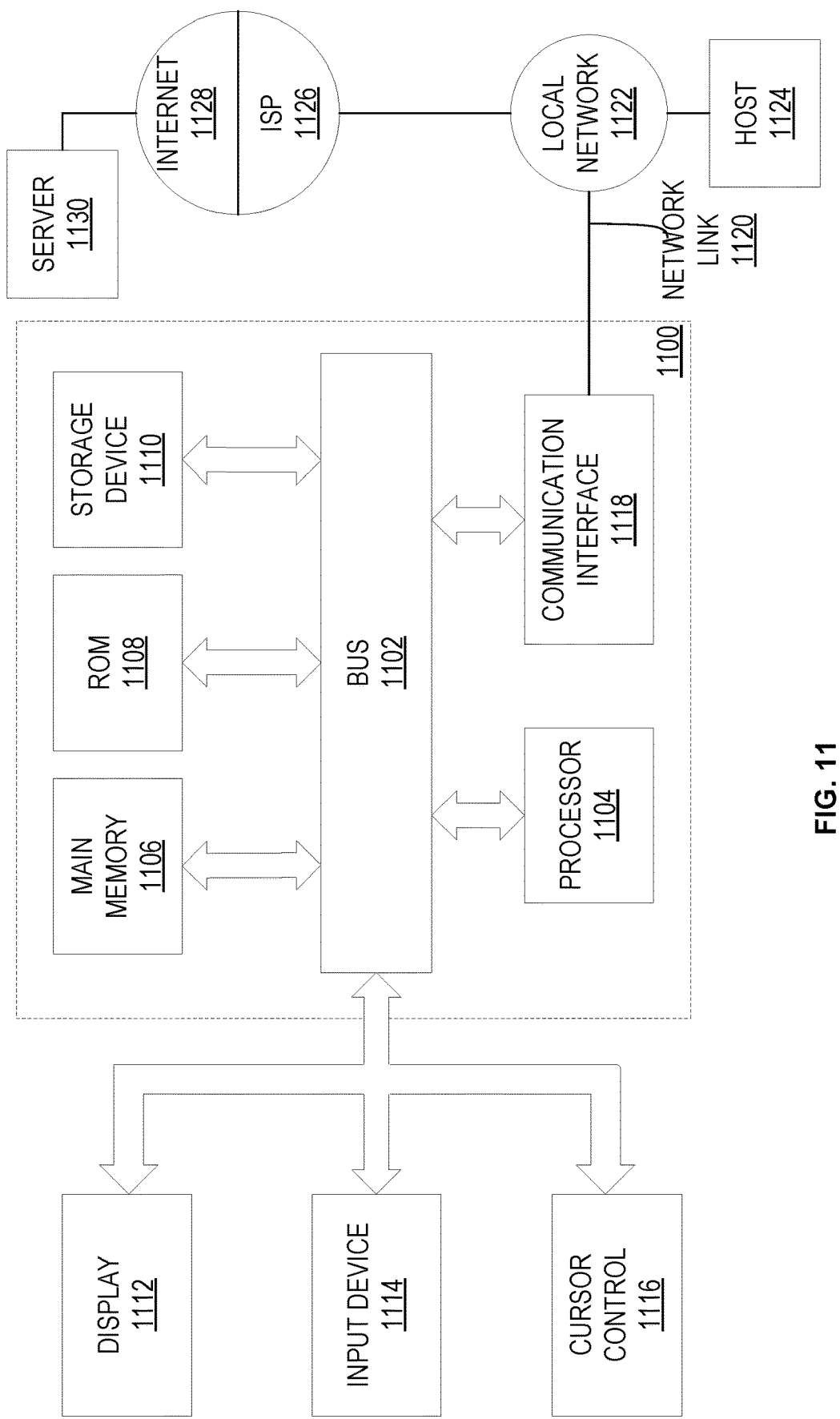
FIG. 11 is a block diagram illustrating an example computer system that may be used in some embodiments.

FIG. 11 is a block diagram that illustrates a computer system 1100 utilized in implementing the above-described techniques, according to an embodiment. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more buses 1102 or other communication mechanism for communicating information, and one or more hardware processors 1104 coupled with buses 1102 for processing information. Hardware processors 1104 may be, for example, general purpose microprocessors. Buses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1112.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In an embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or a solid-state drive of a remote computer. The remote computer can load the instructions into its dynamic memory and use a modem to send the instructions over a network, such as a cable network or cellular network, as modulate signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in an embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As yet another example, the one or more communication interfaces 1118 may include a wireless network interface controller, such as an 802.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a Service Provider 1126. Service Provider 1126, which may for example be an Internet Service Provider (ISP), in turn provides data communication services through a wide area network, such as the worldwide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

In an embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

In an embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Figure 12:
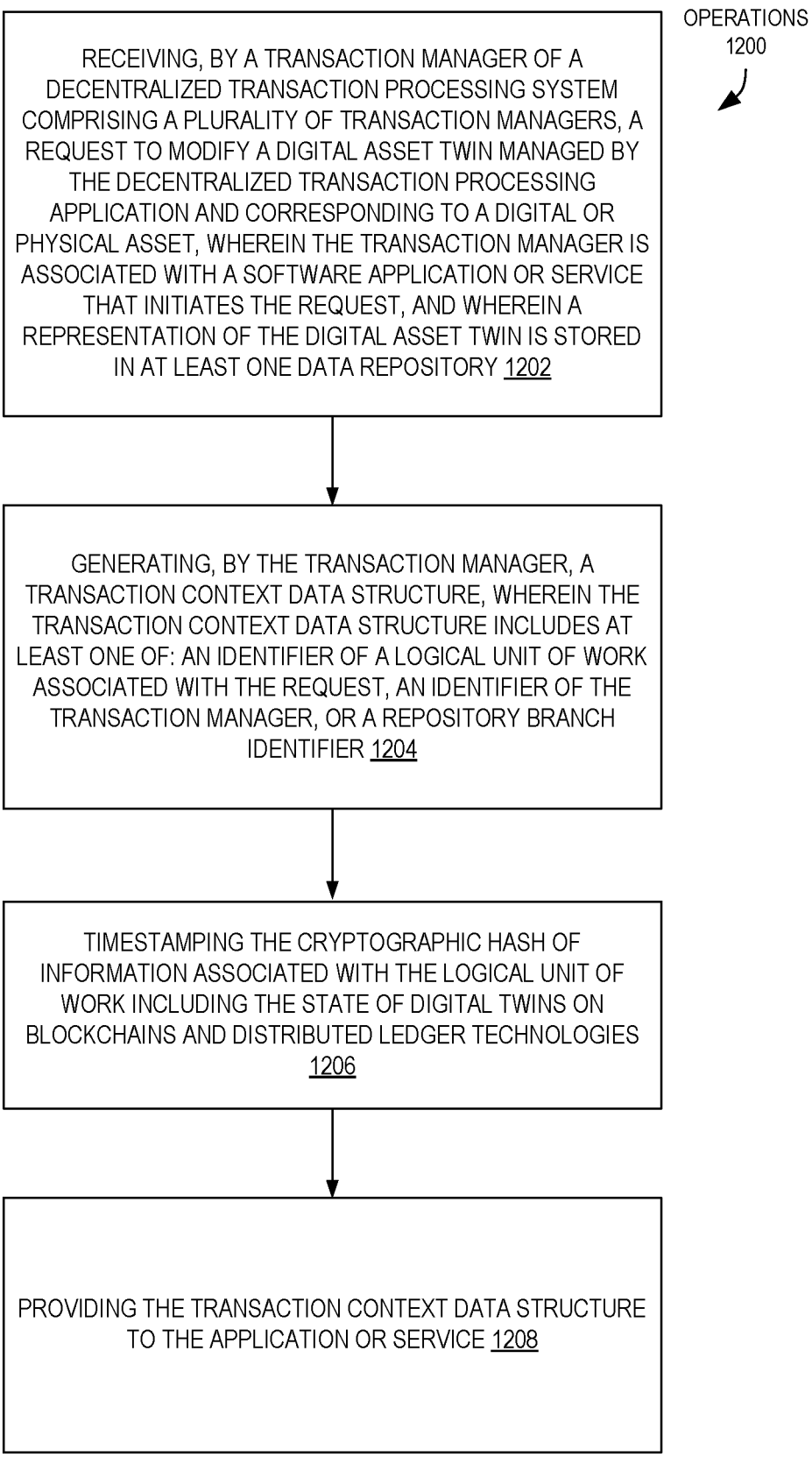
FIG. 12 is a flow diagram illustrating operations of a method for decentralized transaction processing involving digital asset transfer among heterogeneous systems including blockchains as well as traditional digital asset providing services according to some embodiments.

FIG. 12 is a flow diagram illustrating operations 1200 of a method for decentralized transaction processing involving digital asset transfer among heterogeneous systems including blockchains as well as traditional digital asset providing services according to some embodiments. Some or all the operations 1200 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1200 are performed by a logical unit of work manager, or other components of the other figures or combinations thereof.

In some embodiments, the operations 1200 include, at block 1202, receiving, by a transaction manager of a decentralized transaction processing system comprising a plurality of transaction managers, a request to modify a digital asset twin managed by the decentralized transaction processing application and corresponding to a digital or physical asset, wherein the transaction manager is associated with a software application or service that initiates the request, and wherein a representation of the digital asset twin is stored in at least one data repository.

The operations 1200 further include, at block 1204, generating, by the transaction manager, a transaction context data structure, wherein the transaction context data structure includes at least one of: an identifier of a logical unit of work associated with the request, an identifier of the transaction manager, or a repository branch identifier The operations 1200 further include, at block 1206, timestamping the cryptographic hash of information associated with the logical unit of work including the state of digital twins on blockchains and distributed ledger technologies.

The operations 1200 further include, at block 1208, providing the transaction context data structure to the application or service.

In some embodiments, the operations further include generating, by the transaction manager, a repository branch in a data repository storing a representation of the digital asset twin.

In some embodiments, the transaction manager is a first transaction manager, and wherein the operations further include: receiving, by the first transaction manager, a request from a second transaction manager to participate in a transaction represented by the transaction context data structure; and generating a coordination identifier for the second transaction manager.

In some embodiments, the operations further include receiving, from the application or service, a request to commit the logical unit of work; and causing a repository storing a representation of the digital asset twin to modify the digital asset twin.

In some embodiments, the operations further include receiving, by the transaction manager, a request from a second transaction manager to participate in a transaction represented by the transaction context data structure; receiving, from the application or service, a request to commit the logical unit of work; and sending instructions to the second transaction manager to commit the logical unit of work, wherein the instructions cause the second transaction manager to cause a repository storing a representation of the digital asset twin to modify the digital asset twin.

In some embodiments, the operations further include receiving, from the application or service, a request to commit the logical unit of work; determining that the digital asset twin is successfully modified by the transaction manager and any other transaction managers participating in the transaction; and sending a success message to the application or service indicating that the transaction is committed; further synchronizing the state of the digital twins upon commit with the corresponding digital or physical assets.

In some embodiments, the operations further include creating an association between the digital asset twin and at least one other previously persisted digital asset twin to form of graph of digital assets twins.

In some embodiments, the operations further include authorizing the request based on authentication credentials included in the request.

In some embodiments, the transaction manager is a first transaction manager, and the operations further include receiving, by the transaction manager, a request from a second transaction manager to participate in a transaction represented by the transaction context data structure, wherein the second transaction manager is discoverable via a Domain Name System (DNS) registry.

In some embodiments, the operations further include receiving a request to abandon the unit of work associated with the request; and performing a rollback of unit of work, wherein the rollback causes the digital asset twin to revert to its state prior to initiation of the unit of work.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
receiving, by a transaction manager of a decentralized transaction processing system comprising a plurality of transaction managers, a request to modify a digital asset twin managed by the decentralized transaction processing application and corresponding to a digital or physical asset, wherein the transaction manager is associated with a software application or service that initiates the request, and wherein a representation of the digital asset twin is stored in at least one data repository;

responsive to the request to modify the digital asset twin managed by the decentralized transaction processing application, generating, by the transaction manager, a transaction context data structure, wherein the transaction context data structure includes: an identifier of a logical unit of work associated with the request, an identifier of the transaction manager associated with the software application or service that initiated the request, and an identifier of a repository branch in a data repository storing a representation of the digital asset twin;

generating a cryptographic hash of information associated with the logical unit of work, wherein the information associated with the logical unit of work includes a state of the digital asset twin;

timestamping the cryptographic hash on at least one distributed ledger technology-based storage resource; and providing the transaction context data structure to the software application or service.

2. The computer-implemented method of claim 1, further comprising generating, by the transaction manager, the repository branch in the data repository storing the representation of the digital asset twin.

3. The computer-implemented method of claim 1, wherein the transaction manager is a first transaction manager, and wherein the method further comprises:
receiving, by the first transaction manager, a request from a second transaction manager to participate in a transaction represented by the transaction context data structure; and
generating a coordination identifier for the second transaction manager.

4. The computer-implemented method of claim 1, further comprising:
receiving, from the software application or service, a request to commit the logical unit of work; and
causing the data repository storing the representation of the digital asset twin to modify the digital asset twin.

5. The computer-implemented method of claim 1, further comprising:
receiving, by the transaction manager, a request from a second transaction manager to participate in a transaction represented by the transaction context data structure;
receiving, from the software application or service, a request to commit the logical unit of work; and
sending instructions to the second transaction manager to commit the logical unit of work, wherein the instructions cause the second transaction manager to cause the data repository storing the representation of the digital asset twin to modify the digital asset twin.

6. The computer-implemented method of claim 1, further comprising:
receiving, from the software application or service, a request to commit the logical unit of work;
determining that the digital asset twin is successfully modified by the transaction manager and any other transaction managers participating in the transaction;
sending a success message to the software application or service indicating that the transaction is committed; and
further synchronizing the state of the digital asset twin upon commit with the corresponding digital or physical asset.

7. The computer-implemented method of claim 1, further comprising creating an association between the digital asset twin and at least one other previously persisted digital asset twin to form of graph of digital assets twins.

8. The computer-implemented method of claim 1, further comprising authorizing the request based on authentication credentials included in the request.

9. The computer-implemented method of claim 1, wherein the transaction manager is a first transaction manager, and wherein the method further comprises receiving, by the transaction manager, a request from a second transaction manager to participate in a transaction represented by the transaction context data structure, wherein the second transaction manager is discoverable via a Domain Name System (DNS) registry.

10. The computer-implemented method of claim 1, further comprising:
receiving a request to abandon the logical unit of work associated with the request; and
performing a rollback of unit of work, wherein the rollback causes the digital asset twin to revert to its state prior to initiation of the unit of work.

11. A computing device, comprising:
one or more processors; and
a non-transitory computer-readable storage medium having instructions stored thereon that, upon execution by the one or more processors, causes the computing device to:
receive, by a transaction manager of a decentralized transaction processing system comprising a plurality of transaction managers, a request to modify a digital asset twin managed by the decentralized transaction processing application and corresponding to a digital or physical asset, wherein the transaction manager is associated with a software application or service that initiates the request, and wherein a representation of the digital asset twin is stored in at least one data repository;
responsive to the request to modify the digital asset twin managed by the decentralized transaction processing application, generate, by the transaction manager, a transaction context data structure, wherein the transaction context data structure includes: an identifier of a logical unit of work associated with the request, an identifier of the transaction manager associated with the software application or service that initiated the request, and an identifier of a repository branch in a data repository storing a representation of the digital asset twin;
generate a cryptographic hash of information associated with the logical unit of work, wherein the information associated with the logical unit of work includes a state of the digital asset twin;
timestamp the cryptographic hash on at least one distributed ledger technology-based storage resource; and
provide the transaction context data structure to the software application or service.

12. The computing device of claim 11, wherein the instructions, upon execution by the one or more processors, further causes the computing device to generate, by the transaction manager, the repository branch in the data repository storing the representation of the digital asset twin.

13. The computing device of claim 11, wherein the transaction manager is a first transaction manager, and wherein the instructions, upon execution by the one or more processors, further causes the computing device to:

receive, by the transaction manager, a request from a second transaction manager to participate in a transaction represented by the transaction context data structure; and generate a coordination identifier for the second transaction manager.

14. The computing device of claim 11, wherein the instructions, upon execution by the one or more processors, further causes the computing device to:

receive, from the software application or service, a request to commit the logical unit of work; and cause the data repository storing the representation of the digital asset twin to modify the digital asset twin.

15. The computing device of claim 11, wherein the instructions, upon execution by the one or more processors, further causes the computing device to:

receive, by the transaction manager, a request from a second transaction manager to participate in a transaction represented by the transaction context data structure receive, from the software application or service, a request to commit the logical unit of work; and send instructions to the second transaction manager to commit the logical unit of work, wherein the instructions cause the second transaction manager to cause a repository storing a representation of the digital asset twin to modify the digital asset twin.

16. A non-transitory computer-readable medium having stored thereon instructions that, when executed by one or more processors, cause the one or more processors to perform operations including:

receiving, by a transaction manager of a decentralized transaction processing system comprising a plurality of transaction managers, a request to modify a digital asset twin managed by the decentralized transaction processing application and corresponding to a digital or physical asset, wherein the transaction manager is associated with a software application or service that initiates the request, and wherein a representation of the digital asset twin is stored in at least one data repository;

responsive to the request to modify the digital asset twin managed by the decentralized transaction processing application, generating, by the transaction manager, a transaction context data structure, wherein the transaction context data structure includes: an identifier of a logical unit of work associated with the request, an identifier of the transaction manager associated with the software application or service that initiated the request, and an identifier of a repository branch in a data repository storing a representation of the digital asset twin;

generating a cryptographic hash of information associated with the logical unit of work, wherein the information associated with the logical unit of work includes a state of the digital asset twin;

timestamping the cryptographic hash on at least one distributed ledger technology-based storage resource; and providing the transaction context data structure to the software application or service.

17. The non-transitory computer-readable medium of claim 16, wherein the instructions, upon execution by the one or more processors, further cause the one or more processors to perform operations including: generating, by the transaction manager, the repository branch in the data repository storing the representation of the digital asset twin.

18. The non-transitory computer-readable medium of claim 16, wherein the transaction manager is a first transaction manager, and wherein the instructions, upon execution by the one or more processors, further causes the one or more processors to perform operations including:

receiving, by the transaction manager, a request from a second transaction manager to participate in a transaction represented by the transaction context data structure; and generating a coordination identifier for the second transaction manager.

19. The non-transitory computer-readable medium of claim 16, wherein the instructions, upon execution by the one or more processors, further cause the one or more processors to perform operations including:

receiving, from the software application or service, a request to commit the logical unit of work; and causing the data repository storing the representation of the digital asset twin to modify the digital asset twin.

20. The non-transitory computer-readable medium of claim 16, wherein the instructions, upon execution by the one or more processors, further cause the one or more processors to perform operations including:

receiving, by the transaction manager, a request from a second transaction manager to participate in a transaction represented by the transaction context data structure receiving, from the software application or service, a request to commit the logical unit of work; and sending instructions to the second transaction manager to commit the logical unit of work, wherein the instructions cause the second transaction manager to cause the data repository storing the representation of the digital asset twin to modify the digital asset twin.

* * * * *